US012716983B2

(12) United States Patent
Marr, Jr. et al.

(10) Patent No.: US 12,716,983 B2
(45) Date of Patent: Aug. 25, 2026

(54) TWO-WAY TIME TRANSFER IN A COHERENT SENSOR ARRAY SYSTEM

(71) Applicant: CHAOS INDUSTRIES, INC., Hermosa Beach, CA (US)

(72) Inventors: Harry Bourne Marr, Jr., Manhattan Beach, CA (US); Daniel Thompson, Hermosa Beach, CA (US); Ryan Retting, Torrance, CA (US); Mark Jeffrey Rosker, Falls Church, VA (US); Brian Hay, Hermosa Beach, CA (US)

(73) Assignee: CHAOS INDUSTRIES, INC., Hermosa Beach, CA (US)

( * ) Notice: Subject to any disclaimer, the term of this patent is extended or adjusted under 35 U.S.C. 154(b) by 330 days.

(21) Appl. No.: 18/627,205

(22) Filed: Apr. 4, 2024

(65) Prior Publication Data

US 2024/0361419 A1 Oct. 31, 2024

Related U.S. Application Data

(60) Provisional application No. 63/457,241, filed on Apr. 5, 2023.

(51) Int. Cl.
*G01S 5/02* (2010.01)
*H01Q 21/29* (2006.01)

(52) U.S. Cl.
CPC .......... *G01S 5/02216* (2020.05); *G01S 5/021* (2013.01); *H01Q 21/296* (2013.01)

(58) Field of Classification Search
CPC .... G01S 5/02216; G01S 5/021; H01Q 21/296
See application file for complete search history.

(56) References Cited

U.S. PATENT DOCUMENTS 7,016,381 B2 3/2006 Husain et al.
7,356,064 B2 4/2008 Husain et al.
(Continued)

FOREIGN PATENT DOCUMENTS

EP 2705726 A1 3/2014
EP 2803217 A2 11/2014
(Continued)

OTHER PUBLICATIONS

Patent Cooperation Treaty, International Search Report issued in PCT/US2024/023129, Jul. 11, 2024, pp. 1-2.

*Primary Examiner* — Fahmida S Chowdhury
(74) *Attorney, Agent, or Firm* — Pillsbury Winthrop Shaw Pittman, LLP

(57) ABSTRACT

Methods and systems are described herein for time synchronization of a distributed sensor array system ("distributed system"). The distributed system includes multiple sensor nodes, which are time-synchronized using a combination of RF signal data and message-based time techniques across multiple communications mechanisms. Time synchronization is implemented both internally between a sensor node's components and over-the-air between different sensor nodes. The distributed system further employs multiple layers of standardized and custom synchronization protocols to build a scalable, potentially zero-hop, time transfer network. The time synchronization accuracies achieved by the distributed system enable coherency in the distributed system.

99 Claims, 14 Drawing Sheets

410

Establish, via an arbitrary processor node, a zero-hop network architecture between a plurality of sensor nodes, wherein each of the plurality of sensor nodes includes a dedicated TWTT channel
412

Designate, via the processor node, a master node and a plurality of slave nodes, wherein the master node communicates with the dedicated TWTT channel for each of the plurality of slave nodes to form a noiseless timing distribution network
414

Generate, via the master node, a master timing signal from a grandmaster clock, wherein the grandmaster clock achieves at least a picosecond time-synchronization fidelity between the master node and the plurality of slave nodes in the noiseless timing distribution network
416

(56) References Cited

U.S. PATENT DOCUMENTS 8,411,765 B2 4/2013 Smith et al.
8,498,658 B2 7/2013 Smith et al.
8,743,976 B2 6/2014 Smith et al.
8,867,921 B2 10/2014 Smith et al.
8,989,247 B2 3/2015 Smith et al.
9,002,138 B2 4/2015 Ranalli et al.
9,071,742 B2 6/2015 Birkbeck et al.
9,201,132 B2 12/2015 Hsu et al.
9,253,360 B2 2/2016 Birkbeck et al.
9,419,703 B2 8/2016 Smith et al.
9,453,905 B2 9/2016 Smith
9,497,722 B2 11/2016 Husain et al.
9,548,799 B2 1/2017 Hsu et al.
9,793,969 B2 10/2017 Smith et al.
9,794,903 B2 10/2017 Smith et al.
9,806,846 B2 10/2017 Smith et al.
9,921,396 B2 3/2018 Ranalli et al.
9,980,244 B2 5/2018 Smith et al.
10,021,659 B2 7/2018 Rode et al.
10,177,822 B2 1/2019 Smith et al.
11,271,699 B1 * 3/2022 Eyuboglu ............ H04J 11/0073
11,838,151 B1 * 12/2023 Jones .................. H04L 25/0224
2001/0054897 A1 * 12/2001 Taicher ................ G01N 24/081 324/303
2007/0291777 A1 12/2007 Jamieson et al.
2009/0135843 A1 * 5/2009 Veillette .................. H04L 45/28 370/406
2011/0066740 A1 * 3/2011 Campagna .............. H04L 43/08 709/230
2011/0164625 A1 * 7/2011 Fourcand .............. H04J 3/0667 370/498
2012/0293373 A1 * 11/2012 You .......................... G01S 5/06 342/465
2013/0070751 A1 * 3/2013 Atwal ................. H04W 56/001 370/350
2013/0091531 A1 4/2013 Danielsson et al.
2013/0198305 A1 * 8/2013 Veillette .............. H04L 12/1854 709/206
2015/0109489 A1 4/2015 Saperstein et al.
2016/0028675 A1 * 1/2016 Veillette .............. H04L 12/1854 370/312
2016/0047894 A1 2/2016 Rode et al.
2016/0057722 A1 * 2/2016 Premy ............... H04W 56/0015 370/350
2016/0299291 A1 10/2016 Smith et al.
2017/0038456 A1 2/2017 Smith
2017/0086160 A1 3/2017 Smith et al.
2018/0020416 A1 1/2018 Smith et al.
2018/0091205 A1 3/2018 Smith et al.
2018/0294946 A1 * 10/2018 Sinclair .................. H04B 10/61
2019/0028304 A1 * 1/2019 Rode ..................... H04L 1/0006
2019/0332067 A1 * 10/2019 Zhao ......................... G04F 5/00
2020/0076439 A1 * 3/2020 Weeks .................. H03L 7/0805
2020/0328736 A1 * 10/2020 Terstrup .................. H03L 7/085
2020/0403652 A1 * 12/2020 Goff ...................... H04J 3/0617
2021/0152267 A1 * 5/2021 Chan ..................... H04L 51/214
2021/0231813 A1 * 7/2021 Camparo ........... H04B 7/18521
2022/0026192 A1 * 1/2022 Sinclair ................ H04B 10/112
2022/0166458 A1 * 5/2022 Chopra ................ H04B 1/0082
2022/0239541 A1 * 7/2022 Moghaddam ....... H04W 56/001
2022/0286172 A1 * 9/2022 Herschfelt ................ H04L 1/16
2023/0009717 A1 * 1/2023 Bilstad .................. G01S 5/0284
2023/0011851 A1 * 1/2023 Bilstad ................ G01S 5/02216
2023/0048672 A1 * 2/2023 Snowdon .............. H04L 47/283
2023/0137556 A1 * 5/2023 Brown .................. H04J 3/0673 370/235
2023/0189170 A1 * 6/2023 Kim .................... H04W 56/001 370/350
2023/0231641 A1 * 7/2023 Andersson ............ H04J 3/0667 370/503
2023/0232350 A1 * 7/2023 Shen ................... H04W 56/001 375/267
2024/0204898 A1 * 6/2024 Liu ....................... H04J 3/0667
2024/0329256 A1 * 10/2024 Kossin .................... G01S 19/47

FOREIGN PATENT DOCUMENTS

EP 2852232 A2 3/2015
EP 2984901 A1 2/2016
WO 2010042319 A2 4/2010
WO 2013106636 A2 7/2013
WO 2014168892 A1 10/2014
WO 2016137898 A1 9/2016
WO 2012151316 A1 11/2018
WO 2023/049076 A1 3/2023

* cited by examiner

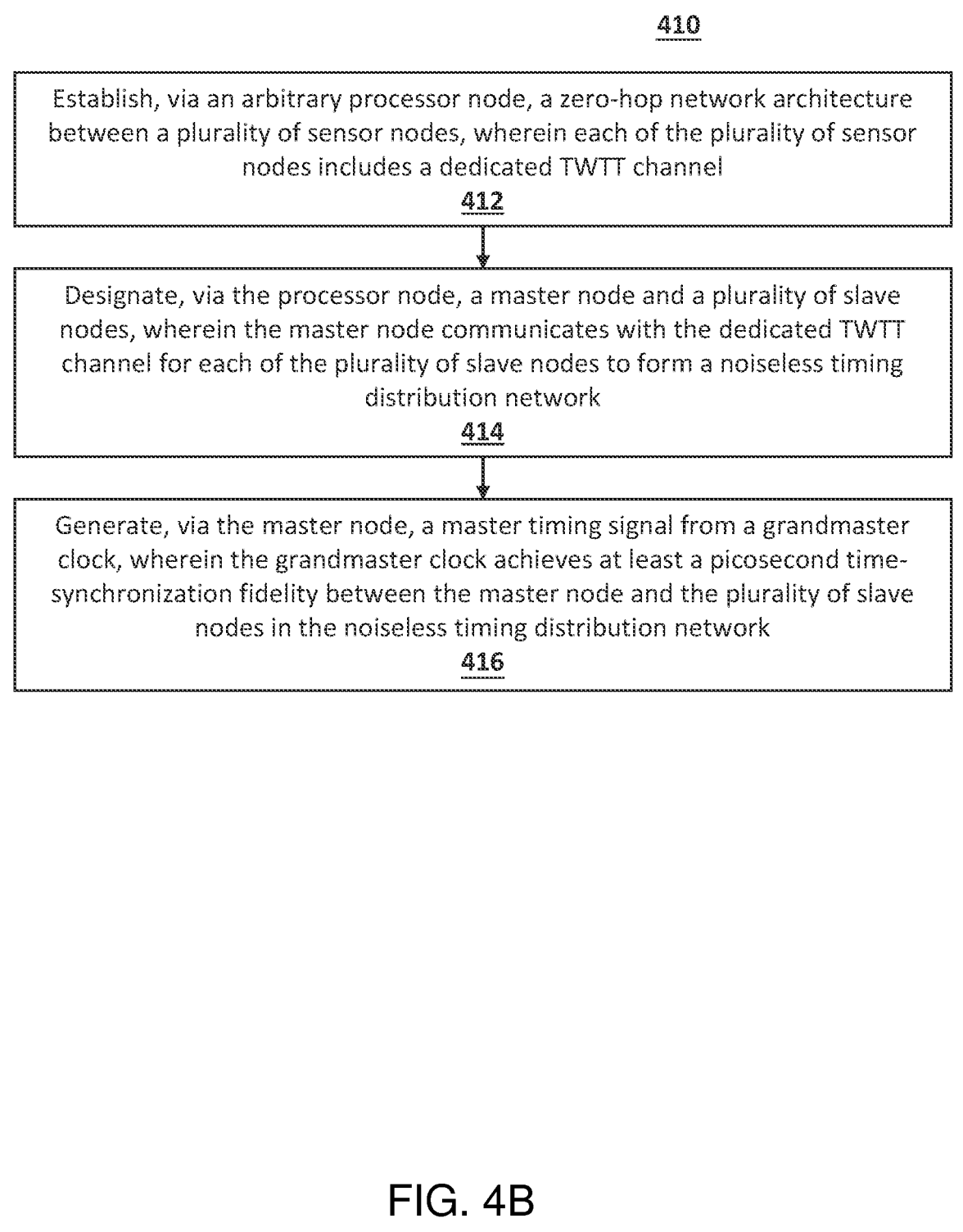

410

Establish, via an arbitrary processor node, a zero-hop network architecture between a plurality of sensor nodes, wherein each of the plurality of sensor nodes includes a dedicated TWTT channel
412

Designate, via the processor node, a master node and a plurality of slave nodes, wherein the master node communicates with the dedicated TWTT channel for each of the plurality of slave nodes to form a noiseless timing distribution network
414

Generate, via the master node, a master timing signal from a grandmaster clock, wherein the grandmaster clock achieves at least a picosecond time-synchronization fidelity between the master node and the plurality of slave nodes in the noiseless timing distribution network
416

FIG. 4B

TWO-WAY TIME TRANSFER IN A COHERENT SENSOR ARRAY SYSTEM

BACKGROUND

Phased array antennas have the unique ability to change the shape and direction of the radiation pattern without physically moving the antenna. Elements in an antenna array are placed in such a way that the signal transmitted by individual antennas sum to provide better gain, directivity, and performance in a particular direction. Time synchronization between various nodes of the phased array system must be maintained so that all the nodes may perform the coherent operations within the same coordinated interval of the clock. However, conventional phased array systems have drawbacks. They are often expensive to implement, too large in size, require excessive power, operate in a limited frequency range, and/or are overly complex (e.g., have intense calibration routines that consume a significant amount of time (e.g., months)). Further, the distance between antenna elements of these systems is limited by the wavelength of the signal being modulated. These and other drawbacks have led to the proposed use of "distributed" arrays in which elements can be physically separated. However, distributed arrays place extraordinary demands on the time synchronization of the separated elements. Synchronization is particularly difficult to maintain if the array, which can now be considered as a network of sensor "nodes," requires timing information to be achieved over successive hops.

SUMMARY

In one general aspect, a method may include establishing, via a processor node, a zero-hop network architecture between a plurality of sensor nodes, where each of the plurality of sensor nodes include a dedicated two-way time transfer (TWTT) channel. A method may also include designating, via the processor node, a master node and a plurality of slave nodes, where the master node communicates with the dedicated TWTT channel for each of the plurality of slave nodes to form a noiseless timing distribution network. A method may furthermore include distributing, via the master node, a master timing signal from a grandmaster clock, where the grandmaster clock is capable of achieving a picosecond time-synchronization fidelity between the master node and the plurality of slave nodes in the noiseless timing distribution network. Other embodiments of this aspect include corresponding computer systems, apparatus, and computer programs recorded on one or more computer storage devices, each configured to perform the actions of the method(s).

In one general aspect, a non-transitory computer-readable medium may include one or more instructions that, when executed by one or more processors of a device, cause the device to: establish, via a processor node, a zero-hop network architecture between a plurality of sensor nodes, where each of the plurality of sensor nodes includes a dedicated two-way time transfer (TWTT) channel; designate, via the processor node, a master node and a plurality of slave nodes, where the master node communicates with the dedicated TWTT channel for each of the plurality of slave nodes to form a noiseless timing distribution network; and distribute, via the master node, a master timing signal from a grandmaster clock, where the grandmaster clock achieves at least a picosecond time-synchronization fidelity between the master node and the plurality of slave nodes in the noiseless timing distribution network. Other embodiments of this aspect include corresponding computer systems, apparatus, and computer programs recorded on one or more computer storage devices, each configured to perform the actions of the methods.

In one general aspect, a system may include one or more processors configured to: establish, via a processor node, a zero-hop network architecture between a plurality of sensor nodes, where each of the plurality of sensor nodes includes a dedicated two-way time transfer (TWTT) channel. A system may designate, via the processor node, a master node and a plurality of slave nodes, where the master node communicates with the dedicated TWTT channel for each of the plurality of slave nodes to form a noiseless timing distribution network. A system may in addition distribute, via the master node, a master timing signal from a grandmaster clock, where the grandmaster clock achieves at least a picosecond time-synchronization fidelity between the master node and the plurality of slave nodes in the noiseless timing distribution network. Other embodiments of this aspect include corresponding computer systems, apparatus, and computer programs recorded on one or more computer storage devices, each configured to perform the actions of the methods.

Methods and systems for a distributed sensor array system ("distributed system") with an improved time synchronization between sensor nodes of the distributed system are described. Each sensor node includes a radio, such as a software-defined radio (SDR), that is connected (e.g., via wired means or wirelessly) to another sensor node or component of the distributed system and facilitates time synchronization between the sensor nodes. While numerous references are made to SDR herein, the term is to be used as a non-limiting example that may refer to analog and/or digital radio equipment, sensor nodes, and/or multiple-input multiple-output (MIMO) sensor array systems. Likewise, any specific frequency ranges, timing fidelity descriptions, communication standards, and professional association standards included herein are illustrative non-limiting examples. For example, terms like "sub-nanosecond" and "picosecond temporal resolution" refer to possible implementations, and the system is intended to employ a wide range of synchronization resolutions to address a number of application-specific problems (e.g., time-aligning the sensor nodes in a coherent phased array). The sensor nodes are configured to share status information with the distributed system such that any received signals or signals transmitted by the sensor nodes are calibrated and synchronized with each other to synchronize data collection across the distributed system. For example, each sensor node is synchronized with a reference node in the distributed system by computing a time offset between the sensor node and the reference node based on a timestamp of a receipt of a calibration signal at the reference node and the corresponding sensor. The data signal received at the sensor node is then "time-aligned" with the data signal received at the reference node based on the time offset. The phase and amplitude of the data signal received at the sensor node may also be aligned with that of the data signal received at the reference node. The sensor nodes may use a known waveform from a transmit node in the distributed system as a calibration signal. Other known waveforms may include global positioning satellite (GPS) signal, a communication waveform from another node such as a millimeter wave, 60 GHz band, 5G, or 6G communications transmitter. The sensor nodes may also be configured using factory-calibrated atomic clocks to synchronize with each other. The sensor nodes may have the capability to self-organize (e.g., share location information such as latitude, longitude, and elevation via the status information) or self-calibrate (e.g., synchronize themselves to the reference node). For example, the distributed system may have location information of the reference node and the sensor nodes that may be used in determining a time difference in arrival of the calibration signal at the sensor nodes with respect to the reference node, which may be further be used in determining the time offset between the sensor nodes and the reference node. The sensor nodes may self-calibrate using factory-calibrated atomic clocks, the calibration signal or other known waveforms on a scheduled basis, prior to transmitting a probe signal, or prior to receiving a response to the probe signal.

Such a distributed system solves various problems of conventional phased array systems. By way of non-limiting description, conventional phased array systems may refer to radar systems generally, large and very large arrays, large arrays with phased array elements, uniform linear arrays, non-uniform arrays, MIMO sensor array systems, conformal arrays, adaptive/reconfigurable arrays, log-periodic dipole arrays, etc. For example, by having the sensor nodes synchronize with a reference node and using at least one transmitter node to broadcast a calibration signal that accounts for multi-node synchronization error, the disclosed concept may achieve time synchronization accuracy well beyond the scope of conventional phased array systems. In another example, by having the sensor nodes self-calibrate, the problem of intense calibration routines that could take months in the conventional phased array systems every time temperature, pressure, moisture, location of phased array changes are solved. In another example, by having each of the sensor nodes synchronize with the reference node, all sensor nodes are one hop away from the reference node, and therefore, the time synchronization does not degrade with scaling of the distributed system. In some embodiments, by having the sensor nodes and the transmit node self-organize, the transmit node need not be co-located with the sensor nodes and therefore, the problem of the transmitter exposing the location of a base station/operator/receiver (e.g., in surveillance applications, such as radar systems) is prevented. In some embodiments, by having a SDR, the distributed system could be configured to work at wide variety of frequency ranges (e.g., low frequency) range, that not only helps in ultra-long range and high-speed radar detecting and sensing applications, but also minimizes a size of the required phased array systems, which otherwise would have been very large or infeasible to implement for low frequency operations.

The distributed nature of the system(s) described herein has various advantages. A distributed system facilitates detection of high-speed airborne objects much better without having to alias the doppler signal in. A distributed system detects airborne objects at much longer range than conventional radar systems, especially for a given volume (the distributed system occupies lesser volume, weighs lesser, consumes lesser power than the conventional phased array systems). A distributed system is significantly less expensive and faster to deploy than the conventional phased array systems. A distributed systems allows the receivers (e.g., the sensor nodes) and the transmitter node to be very distant and not co-located (e.g., transmitted may be in motion too) such that the transmitter doesn't give away the receiver's location solving the counter stealth problem. A distributed system provides better angular resolution for a given frequency than the conventional phased array systems because the sensor nodes can be spaced out much further. A distributed system provides a new "pass through" radar capability where the receiver may be directly in line with the transmission and doesn't depend on a reflection. For example, the sensor nodes may analyze the backscattering of signals that are transmitted through a chemical plume to identify characteristics (e.g., concentration, composition, relative position, etc.) of said plume.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 4B shows a flowchart of a method for synchronizing temporally focused sensor nodes in a distributed system using a precision timing protocol (PTP), consistent with various embodiments.

DETAILED DESCRIPTION

Figure 1:
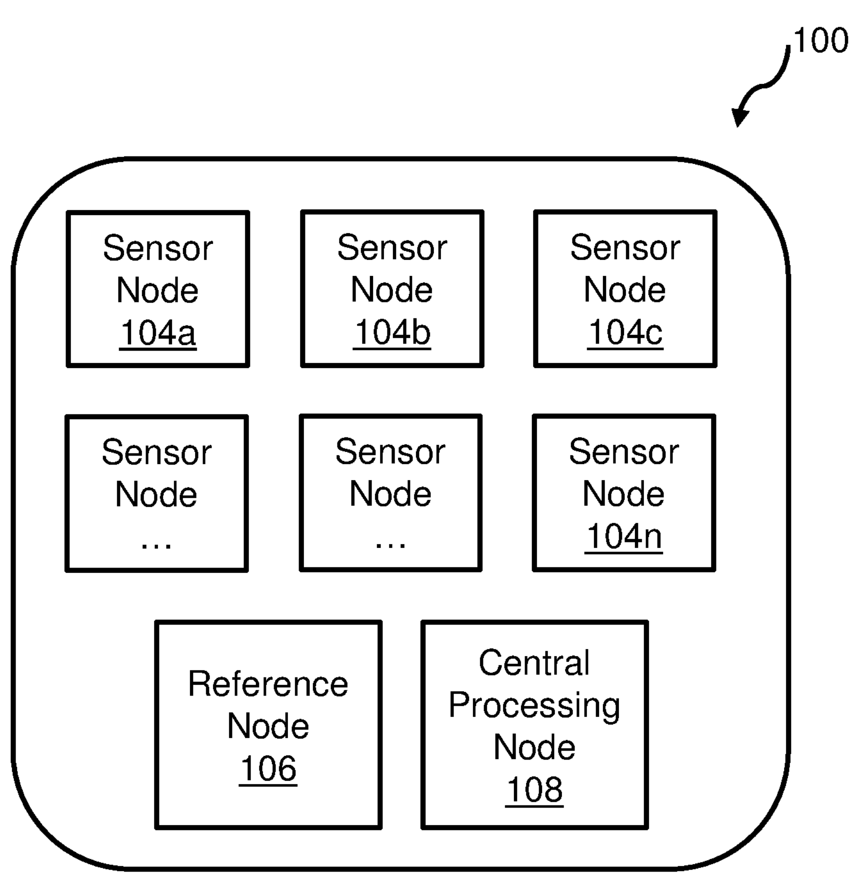
FIG. 1 shows a distributed sensor array system, consistent with various embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form to avoid unnecessarily obscuring the embodiments of the invention.

The disclosed concept relates to a system that leverages a radio, such as a software-defined radio (SDR), comprising a number of time aligned antenna nodes to provide a flexible multi-function radio frequency (RF) solution. For example, the system may provide communications, radar, and electronic intelligence (ELINT) capabilities in a rapidly deployable software-defined architecture. In some embodiments, the system leverages machine learning algorithms to enable a phased array of SDR antenna elements to mitigate, respond to, and potentially implement RF interference and jamming techniques (e.g., frequency hopping jamming, spread spectrum jamming, powerful pulse jamming, smart or adaptive jamming, low probability of intercept (LPI) techniques). For example, the system may implement or respond to jamming operations where the jamming devices rapidly switch frequencies, making it difficult for traditional static-frequency countermeasures to adapt. The system may implement or respond to jamming operations where jammers spread their energy across a wide range of frequencies, effectively diluting the power of the jamming signal but impacting a broader set of frequencies. The system may employ or respond to synchronized short bursts of high-power signals capable of overwhelming receivers (e.g., systems relying on sensitive detection equipment). The system may employ or respond to jamming operations that analyze the target's signal and adapt the jamming strategy accordingly. The system may employ or respond to jamming operations that mimic legitimate signals to create confusion or use selective jamming techniques to target specific communications while leaving others unscathed. The system may employ or respond to jamming operations that use signals with low power levels to remain undetected while still effectively disrupting communications. The system is designed to adapt with continuous advancement in both jamming techniques and beamforming countermeasures used in electronic warfare. The system's ability to rapidly adapt to the changing electronic warfare landscape is designed to both leverage and counteract the integration of advanced technologies such as AI and machine learning. The system may leverage adaptive beamforming techniques to point high-gain directional beams toward satellites of interest while simultaneously creating null beams to cancel 5G and/or multispectral interference. These beams can be arbitrarily steered in real time to track the satellite's transition across the sky based on orbital parameters known a priori and/or gathered in real time. Further, being able to synchronize multiple antenna nodes provides a technical discriminator enabling the system to implement a scalable processing architecture where the computational overhead of signal processing and adaptive beamforming required to cohere groups of subarray elements within the phased array is distributed across a number of processor nodes.

FIG. 1 shows a distributed sensor array system 100, consistent with various embodiments. For example, the distributed sensor array system ("distributed system") 100 may include a plurality of sensor nodes 104*a*-104*n* that facilitate transmission of waveforms as beams in a desired direction. In some embodiments, the distributed system 100 may include any combination of dense and sparse phased array systems (e.g., dense only, sparse only, a combination thereof). Further, the distributed system 100 may adaptively select an appropriate sensor node configuration based on operational requirements, adversarial maneuvers, and/or changing environmental conditions. Each of the sensor nodes may include radio frequency antenna elements. In some non-limiting embodiments, the sensor nodes include a SDR that is configured to operate in a wide range of radio frequencies (e.g., 3 Hz to 3000 GHz). The distributed system 100 may be implemented for various applications. For example, the distributed system 100 may be implemented for surveillance as a radar system, a sonar system, in oil and gas industry for finding energy, in mining industry for finding metals, multimodal data fusion, etc. Target use cases include detections (greenhouse gas plume detection with volumetrics), subsurface detections (reduction of the ellipsoid of uncertainty (EOU), spacing optimization, and shallow subsurface pipeline integrity detection); and software integration (hardware-agnostic software applied to existing sensors for true autonomous operations.

The following paragraphs describe the distributed system 100 configured to implement a two-way time transfer protocol to synchronize the plurality of sensor nodes 104*a*-104*n*. The distributed system 100 may utilize a wireless over-the-air (OTA) calibration signal as a temporal focusing component to increase the synchronization accuracy of a precision timing protocol (PTP) based time synchronization network. For example, the calibration signal may provide an additional reference clock against which each of the plurality of sensor nodes 104*a*-104*n* can validate the time transfer accuracy of a time synchronization protocol that is managing the distributed system 100. In some embodiments, the time synchronization protocol may be any viable method of coordinating a plurality of independent clocks used to control and/or time align the plurality of sensor nodes 104*a*-104*n*. The systems and methods described herein are intended to be time transfer protocol agnostic. To that end, some non-limiting embodiments of the time synchronization protocol may employ PTP (e.g. any operable version of IEEE 1588) to achieve sub-nanosecond accuracy. That is, in the time synchronization protocol a two-way exchange of PTP synchronization messages allows precise adjustment of clock phase and offset, and link delay may be known precisely via accurate hardware timestamps and the calculation of delay asymmetry. Further, the OTA waveform calibration and synchronization methodology may be employed to time-synchronize multiple nodes wirelessly for distributed sensing systems. In some non-limiting embodiments, this synchronization may be performed per-channel continuously at every coherent processing interval (CPI) and can achieve GPS-like wireless time synchronization tidelity for multiple nodes. This waveform synchronization may be accomplished by (a) computing offsets between nodes via RF; and (b) using Wi-Fi peer-to-peer link to adjust Command/Control using that offset.

In some embodiments, the distributed system 100 makes use of dedicated fiberoptic and/or ethernet time-transfer channels to connect the plurality of sensor nodes 104*a*-104*n* in a noiseless zero hop network. Further, node excitation data for each of the plurality of sensor nodes 104*a*-104*n* may be communicated through a separate communication channel such that the entirety of the dedicated time-transfer channel bandwidth is allocated to time-transfer information. This time signal sequestration creates TWTT channels that communicate with the grandmaster without any additional signal data noise. This reduces the processing overhead and latency required to separate timing data from nose in time-transfer synchronization, thereby increasing synchronization precision and accuracy. The distributed system 100 utilizes a host of techniques whose aggregate allows for the creation of a fully deterministic network for general purpose data transfer and sub-picosecond accuracy time transfer. For example, the distributed system 100 may be configured into a dynamically adaptive distribution (DyAD) processing architecture capable of utilizing nonuniform phased arrays of sensor nodes 104*a*-104*n* for multimodal sensor operations (e.g., Adaptive mesh networking, multistatic Simultaneous Transmit and Receive (STAR), Time-based multi-sensor tasking, GPS jamming mitigation, GPS independent location services, etc.). For DyAD processing, the distributed sensor array system 100 may be configured as a scalable system of subarrays, each of which may function as a processor and/or timing-distribution node for any number of subordinate sensor nodes 104*a*-104*n*. In some embodiments, the distributed system 100 facilitates transmission and reception of radio frequency (RF) waveforms, but the distributed system 100 is not limited to working with RF waveforms and may be configured to work with other waveforms as well (e.g., acoustic waves, seismic waves, etc.).

A sensor node 104*a* may be configured to be only one of (a) a transmit only sensor node in which case it may transmit waveforms but not receive waveforms, (b) a receive only sensor node in which case it may receive waveforms but not transmit waveforms, or (c) both transmit and receive sensor node in which case it may transmit or receive waveforms. Unless stated otherwise, a sensor node may be both a transmit and receive sensor node. Each of the sensor nodes 104*a*-104*n* may be configured to transmit an outgoing waveform (e.g., referred to as a "probe signal") that may all combine together to form a beam in a particular direction. Each of the sensor nodes 104*a*-104*n* may receive a response to the probe signal (e.g., referred to as a "data signal") that may be "time aligned" and cohered by the distributed system 100 for further processing (e.g., by a third-party system) for one or more applications.

The distributed system 100 time synchronizes the sensor nodes 104*a*-104*n* to time align the transmitted probe signals or the data signals received by the sensor nodes. In some embodiments, time aligning the data signals includes applying at least one of a time offset, phase, or amplitude to the data signals such that the data signals of all sensor nodes 104*a*-104*n* have the same time offset, phase and amplitude. The distributed system 100 may synchronize the sensor nodes 104*a*-104*n* in several ways. In one example, each sensor node may have their own local clock (e.g., a quartz oscillator) and the local clock may be synchronized with a phase lock loop, which is synchronized with an external signal such as (a) an external clock signal that is wired to each receiver, or (b) a wireless external signal such as a GPS signal, an astrological signal (e.g., a quasar signal, the cosmic microwave background signals or other signals from radio astronomy), waveforms from television towers, acoustic waveform, or a calibration signal from a transmitter node in the distributed system 100 (additional details of which are described below). In another example, each sensor node's local clock may be made up of an atomic clock with a low drift Rubidium oscillator (e.g., that may not drift more than a microsecond over the period of days or even months), where the atomic clock for each sensor node may be synchronized and aligned at the factory before the sensor nodes are deployed.

In some embodiments, each of the sensor nodes 104*a*-104*n* shares status information with the distributed system 100 (e.g., one or more other sensor nodes) such that any received signals or signals transmitted by the sensor nodes are calibrated and synchronized with each other to synchronize data collection across the distributed system 100. The status information may include, temperature in an environment of the sensor node; location (such as determined by GPS) of the sensor node; calibration metrics such as phase and amplitude offsets of the RF components (or optical components in the case of optics); or a timestamp of an occurrence of an event such as (a) a receipt of a signal (e.g., calibration signal, GPS signal, or any other known waveform) or (b) a receipt of a request for local timestamp of the sensor node. In some embodiments, the distributed system 100 synchronizes each of the sensor nodes 104*a*-104*n* with a reference node 106 of the distributed system 100 by computing a time offset between a timestamp of an occurrence of the event at a reference node 106 of the distributed system 100 and a timestamp of an occurrence of the event at the corresponding sensor node. For example, in the event the sensor nodes 104*a*-104*n* are implemented using factory-calibrated atomic clocks, a sensor node of the distributed system 100 (e.g., a central processing node 108) sends a request to each of the sensor nodes 104*a*-104*n*, including a reference node 106 of the distributed system 100, for a local timestamp of the corresponding sensor node and obtains a response including the local timestamp (e.g., a time at which the request is received at the corresponding sensor node). The distributed system 100 synchronizes a first sensor node 104*a* with the reference node 106 by computing a time offset between a reference timestamp of the reference node 106 and a first timestamp of the first sensor node 104*a*. In some embodiments, the reference node 106 functions as a grandmaster or master node in a PTP time transfer system where the remaining sensor nodes are slave nodes that are synchronized to the reference node's clock according to the time synchronization protocol the.

In another example where the distributed system 100 is configured to synchronize the sensor nodes 104*a*-104*n* using a calibration signal, the distributed system 100 synchronizes each of the sensor nodes 104*a*-104*n* with a reference node 106 of the distributed system 100 by computing a time offset between a timestamp of a receipt of a calibration signal at a reference node 106 of the distributed system 100 and a timestamp of receipt of the calibration signal at the corresponding sensor node. For example, the distributed system 100 synchronizes a first sensor node 104*a* with the reference node 106 by computing a time offset between a timestamp of a receipt of a calibration signal at the reference node 106 and a first timestamp of receipt of the calibration signal at the first sensor node 104*a*.

When a probe signal is transmitted or a data signal is received by the sensor nodes 104*a*-104*n*, the distributed system 100 (e.g., a central processing node 108) may apply the corresponding time offsets to the probe signals or the data signals of the sensor nodes 104*a*-104*n* to generate time aligned data signal for each of the sensor nodes 104*a*-104*n*. Additional details with respect to time synchronization of the sensor nodes 104*a*-104*n* are described at least with reference to FIGS. 3-5 below.

After the data signals are time aligned, the distributed system 100 coheres the time aligned data signals to generate a combined data signal with a coherent gain such that power level of the combined signal may be a function of the individual time aligned signals being combined. For example, the power level of the cohered signal is a sum of the power levels of the individual time aligned signals of the different sensor nodes. In another example, the power level of the cohered signal is greater than the power levels of any of the individual time aligned signals of the different sensor nodes. In some embodiments, the data signals are cohered by adding the time domain signals together from the different sensor nodes 104*a*-104*n* such that the data signals are time aligned and coherently added together. The cohered signal may then be intelligently signal processed by the distributed system 100, or provided to a third-party system, for one or more applications. One such application may include a surveillance application, such as a radar system to determine one or more parameters of an object (e.g., speed and distance of an aircraft) in an environment of the distributed system 100. Another application may include detection of radar pulses. Another application may include digital receive beamforming.

In some embodiments, one of the sensor nodes 104*a*-104*n* is designated as a reference node 106, whose clock acts as a reference clock for synchronizing the clocks of the other sensor nodes 104*a*-104*n*. In some embodiments, a central processing node 108 is one of the sensor nodes 104*a*-104*n* that is configured to perform various types of processing, such as computing time offsets, generating time aligned data signals, cohering time aligned data signals, etc. In some embodiments, the central processing node 108 and the reference node 106 are the same sensor node.

In some embodiments, the sensor nodes 104*a*-104*n* may operate independent of each other, may not be physically connected to one another as they can communicate with other entities of the distributed system 100 wirelessly, which enables the distributed system 100 to be not only easily scalable but also to be configured to operate at low frequencies for ultra-long range and high-speed detection while keeping the size the distributed system 100 to minimum, which is a significant advantage over conventional phased array systems. The conventional phased array systems would have been very large or infeasible to implement for low frequency operations as the size of the antenna is inversely proportional to the transmission/reception frequency, and the circuit boards that would house such antennas would be significantly large that is either difficult or infeasible to manufacture. In the distributed system 100, the sensor nodes 104*a*-104*n* can be spaced $\lambda/2$ (where $\lambda$ is wavelength of the signal) distance units apart from each other. For example, if the frequency of the waveform transmitted by the sensor nodes 104*a*-104*n* is 50 MHz, which corresponds to a wavelength of approximately 6 meters, the sensor nodes 104*a*-104*n* may be placed approximately "3" meters apart from each other. The sensor nodes 104*a*-104*n*, including the reference node 106 and the central processing node 108, may be co-located (e.g., located within a specified number of wavelengths of the operating frequency) or may be remotely located (e.g., located beyond the specified number of wavelengths of the operating frequency). For example, the first sensor node 104*a* and the second sensor node 104*b* may be co-located, while the reference node 106 may be remotely located. In another example, the first sensor node 104*a* and the second sensor node 104*b* may be co-located, while a third sensor node 104*c* may be remotely located. Regardless of how the sensor nodes 104*a*-104*n* are located, the sensor nodes 104*a*-104*n* may be synchronized as long as the location information of the sensor nodes 104*a*-104*n*, the reference node 106 or the central processing node 108 is available. For example, as mentioned above, the sensor nodes 104*a*-104*n* may have the capability to self-organize (e.g., share location information such as latitude, longitude, and elevation via the status information) or self-calibrate (e.g., synchronize themselves to the reference node 106). The distributed system 100 may have location information of the reference node 106 and sensor nodes 104*a*-104*n* that may be used in determining a time difference in arrival of the calibration signal at the sensor nodes with respect to the reference node 106, which may be further be used in determining the time offset between the sensor nodes 104*a*-104*n* and the reference node 106. The sensor nodes may self-calibrate using the factory-calibrated atomic clocks, the calibration signal or other known waveforms on a scheduled basis, prior to transmitting a probe signal, or prior to receiving a response to the probe signal.

The distributed system 100 may be easily scaled up or scaled down by adding or removing sensor nodes, respectively. Furthermore, since each sensor node 104*a*-104*n* may communicate with the reference node 106 or the central processing node 108 directly, all the sensor nodes 104*a*-104*n* are a single hop away from the reference node 106 or the central processing node 108, and any scaling of the distributed system 100 may not result in degradation of the time synchronization accuracy. In some embodiments, by having the sensor nodes distributed widely in space, interferometry data between the sensor nodes may be done and accurate angle accuracy may be obtained even at low frequencies.

While FIG. 1 shows a single cluster of sensor nodes 104*a*-104*n*, the distributed system 100 may have several clusters in which each cluster may have several sensor nodes. Different clusters may have different number of sensor nodes or the same number of sensor nodes. In some embodiments, such a configuration enables detection of a moving object at ultra-long range and high speeds; better angle resolution than available with a single cluster. Also, some clusters may remain completely passive making the location of the cluster difficult to impossible to ascertain since no active transmissions. Yet another advantage of having multiple clusters may be that one cluster could be significantly closer in distance to the received signal and this suffers much less free space path loss of the signal and thus, get a much stronger signal to share between nodes. In some embodiments, the clusters may be spread over a few hundred meters. Each cluster may generate a cohered signal from the time aligned signals of its constituent sensor nodes and the cohered signal from all the clusters may be further cohered to generate a master cohered signal with a coherent gain such that the power level of the master cohered signal is a function of the power levels of the constituent cohered signals of the different clusters. For example, the power level of the master cohered signal is a sum of the power levels of the constituent cohered signals of the different clusters. In another example, the power level of the master cohered signal is greater than the power levels of any of the constituent cohered signals of the different clusters.

Figure 2:
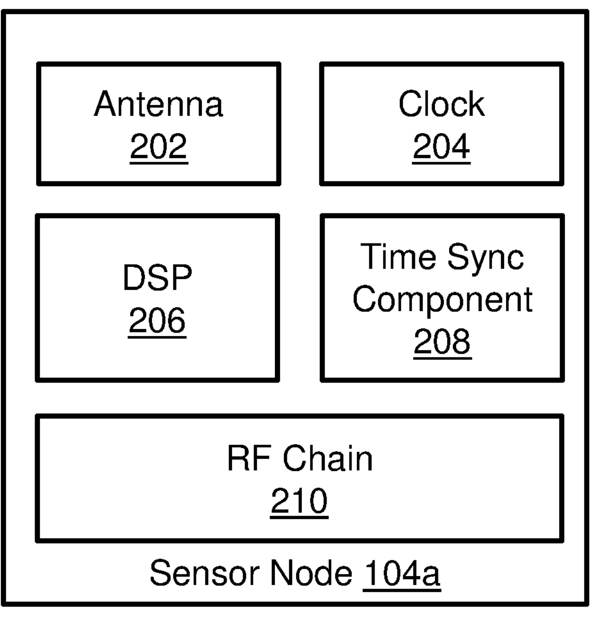
FIG. 2 is a block diagram of a sensor node of a distributed system of FIG. 1, consistent with various embodiments.

FIG. 2 is a block diagram of a sensor node of a distributed system of FIG. 1, consistent with various embodiments. A sensor node (e.g., first sensor node 104*a*) includes an antenna 202 that facilitates radiation or reception of waveforms when connected to a transmitter or receiver (not illustrated). The antenna 202 may be configured to transmit or receive waveforms of a wide range of frequencies. The first sensor node 104*a* may include a clock 204 that generates a clock signal for use in synchronizing the operations (e.g., coordinate sequence of actions) of the first sensor node 104*a*. The clock 204 may be a quartz clock, an atomic clock, or another type of clock.

The first sensor node 104*a*-104*n* may include a time synchronization component 208 that synchronizes the clock 204 of the first sensor node 104*a* in any of a number of ways mentioned above. For example, the time synchronization component 208 synchronizes the clock 204 with an external signal such as an external clock signal that is wired to the first sensor node 104*a* or a wireless external signal such as a GPS signal or an astrological signal. In another example, the time synchronization component 208 synchronizes the clock 204 to a clock of the reference node 106 using a calibration signal from a transmitter node (additional details of which are described at least with reference to FIGS. 3-5 below).

The first sensor node 104*a* includes a digital signal processor (DSP) 206 that is configured to perform various signal processing operations including generating time aligned signals, match filtering received calibration signals or data signals, setting a frequency range of the first sensor node 104*a*, radar signal processing, etc. In some non-limiting embodiments, DSP 206 includes field programmable gate arrays (FPGA) that enable each sensor node 104*a*-104*n* to function as a reconfigurable master node capable of distributing a master timing signal to a plurality of slave nodes 104*a*-104*n* through a time transfer network. Each sensor node 104*a*-104*n* may be used as a reconfigurable Time synchronization interface capable of distributing master time signals to changing clusters or sensor nodes 104*a*-104*n*.

The first sensor node 104*a* includes an RF chain 210. In some embodiments, the RF chain 210 may be a cascade of electronic components and sub-units which may include any of amplifiers, filters, mixers, attenuators, and detectors. All these components may be combined to serve a specific application (e.g., a radar system for detection of moving objects). One or more of the components (e.g., the DSP 206 and time synchronization component 208) may be implemented using an SDR. The SDR facilitates various functionalities. For example, the SDR may facilitate obtaining of location information of the sensor nodes 104*a*-104*n*, the reference node 106 or the central processing node 108 (e.g., using a GPS). In another example, the SDR may facilitate in the generation of time aligned data signals.

Note that one or more components of the first sensor node 104*a* may be communicatively coupled to another device of the distributed system 100 via a communication module to coordinate its operations. Some or all of the components of the first sensor node 104*a* may be combined as one component. A single component may also be divided into sub-components, each sub-component performing separate method step or method steps of the single component. Any one or more of the components described herein may be implemented using hardware (e.g., a processor of a machine) or a combination of hardware and software. For example, any component described herein may configure a processor to perform the operations described herein for that component.

Figure 3A:
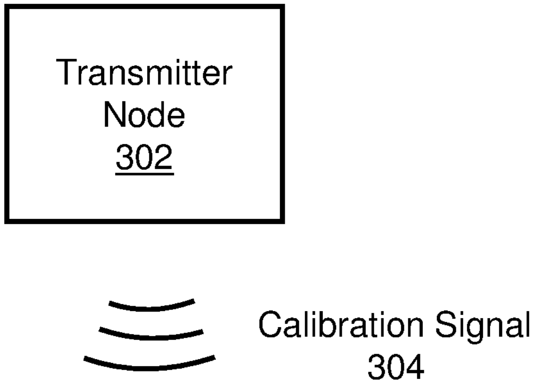
FIG. 3A shows an example of synchronizing the sensor nodes using a calibration signal from a transmitter node of the distributed system of FIG. 1, consistent with various embodiments.
Figure 3A:
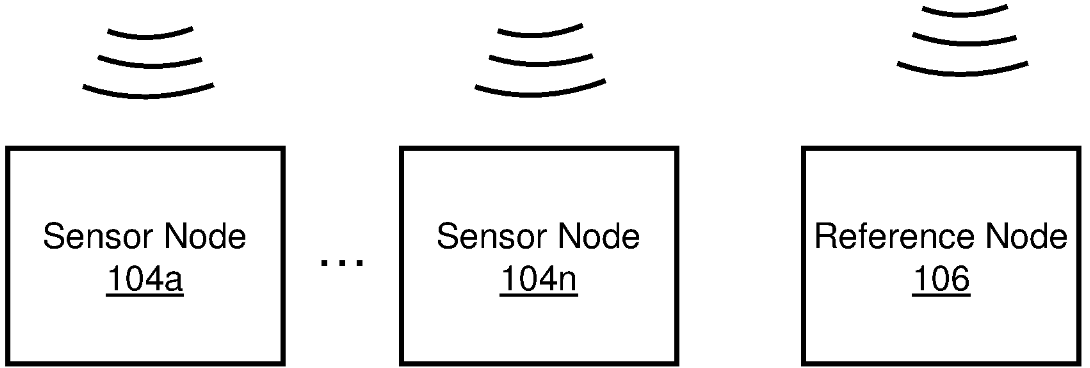

FIG. 3A shows an example of synchronizing the sensor nodes 104*a*-104*n* using a calibration signal 304 from a transmitter node 302 of the distributed system 100. The calibration signal 304 may be any of a wide range of frequencies. FIGS. 3-5 below show examples of TWTT synchronization using a plurality of modalities including using a calibration signal from a transmitter node 302, a local grandmaster clock, and/or a dedicated time distribution channel. Note that the time synchronization is not limited to being performed using a calibration signal, it can be performed in a number of ways as mentioned above at least with reference to FIG. 1. For example, the sensor nodes 104*a*-104*n* may be time synchronized using an external wireless signal such as a calibration signal 304 that is of a known waveform, such as a GPS signal, an astrological signal, seismic signal, acoustic signal, a signal transmitted from a transmitter (e.g., signal from television towers), or a signal transmitted from a transmitter node of the distributed system 100. In another example, time synchronization may be achieved by using factory-calibrated atomic clocks in the sensor nodes 104*a*-104*n*. Further, note that while FIGS. 3-5 discuss time synchronization with reference to a data signal being received by the sensor nodes 104*a*-104*n*, the concept of time synchronization is not limited to the data signals received by the sensor nodes, it is applicable to the probe signals transmitted by the sensor nodes as well.

FIG. 3A is a block diagram of time synchronization of sensor nodes in the distributed system of FIG. 1, consistent with various embodiments. The transmitter node 302 may be co-located with the sensor nodes 104*a*-104*n* or may be remotely located. In some embodiments, the transmitter node 302 is considered to be co-located with the sensor nodes 104*a*-104*n* if the transmitter node 302 is within a specified proximity (e.g., a specified number of wavelengths of the calibration signal 304) of the sensor nodes 104*a*-104*n*. For example, if the transmitter node 302 frequency of transmission is 144 MHz, then the transmitter node 302 is considered to co-located with the sensor nodes 104*a*-104*n* if it is within a threshold distance (e.g., 20-50 meters) of any of the sensor nodes 104*a*-104*n*. If the transmitter node 302 is beyond the specified proximity (e.g., beyond 50 m for 144 MHz frequency) of the sensor nodes 104*a*-104*n*, then the transmitter node 302 is considered to be remotely located. In some embodiments, the transmitter node 302 can even be located beyond the horizon in the case where the transmitter is quite powerful (e.g., hundreds or thousands of watts per transmit power amp with multiple transmit antennas that create a transmit phased array, and where the transmit frequency is at 50 MHz). Further yet, the transmitter node 302 may also be configured to be mobile, in motion or moving. In some embodiments, by having the transmitter node 302 being remotely located with respect to the sensor nodes, and being in motion, a "no probability of detection" sensor system may be established (e.g., because the transmitter node 302 is not co-located with the receiver sensor nodes, an adversary may not geo-locate the receiver sensor nodes by using the transmitter signal).

Regardless of whether the transmitter node 302 is co-located or remotely located, the transmitter node 302 is located in a known location relative to the sensor nodes 104*a*-104*n*, and the calibration signal 304 may be "seen" (e.g., calibration signal 304 is above the noise) or received by the sensor nodes 104*a*-104*n* without the need for signal processing. For example, the distributed system 100 may know the location information (e.g., latitude, longitude information) of the transmitter node 302. Such a configuration provides the flexibility of having the transmitter node 302 at any of various locations, and also eliminates the need for the sensor nodes 104*a*-104*n* to be in line of sight with each other.

Each of the sensor nodes 104*a*-104*n*, including the reference node 106, receives the calibration signal 304 and determines a timestamp of the receipt of the calibration signal 304. The distributed system 100 computes the time offsets of the sensor nodes 104*a*-104*n* based on the timestamps of the sensor nodes 104*a*-104*n* and the timestamp of the reference node 106 to synchronize the sensor nodes 104*a*-104*n* with respect to the reference node 106. Additional details of synchronizing the sensor nodes 104*a*-104*n* with respect to a reference node 106 in the distributed system 100 using a calibration signal 304 from a transmitter node 302 are described in more detail with respect to FIGS. 5A-5C below.

Figure 3B:
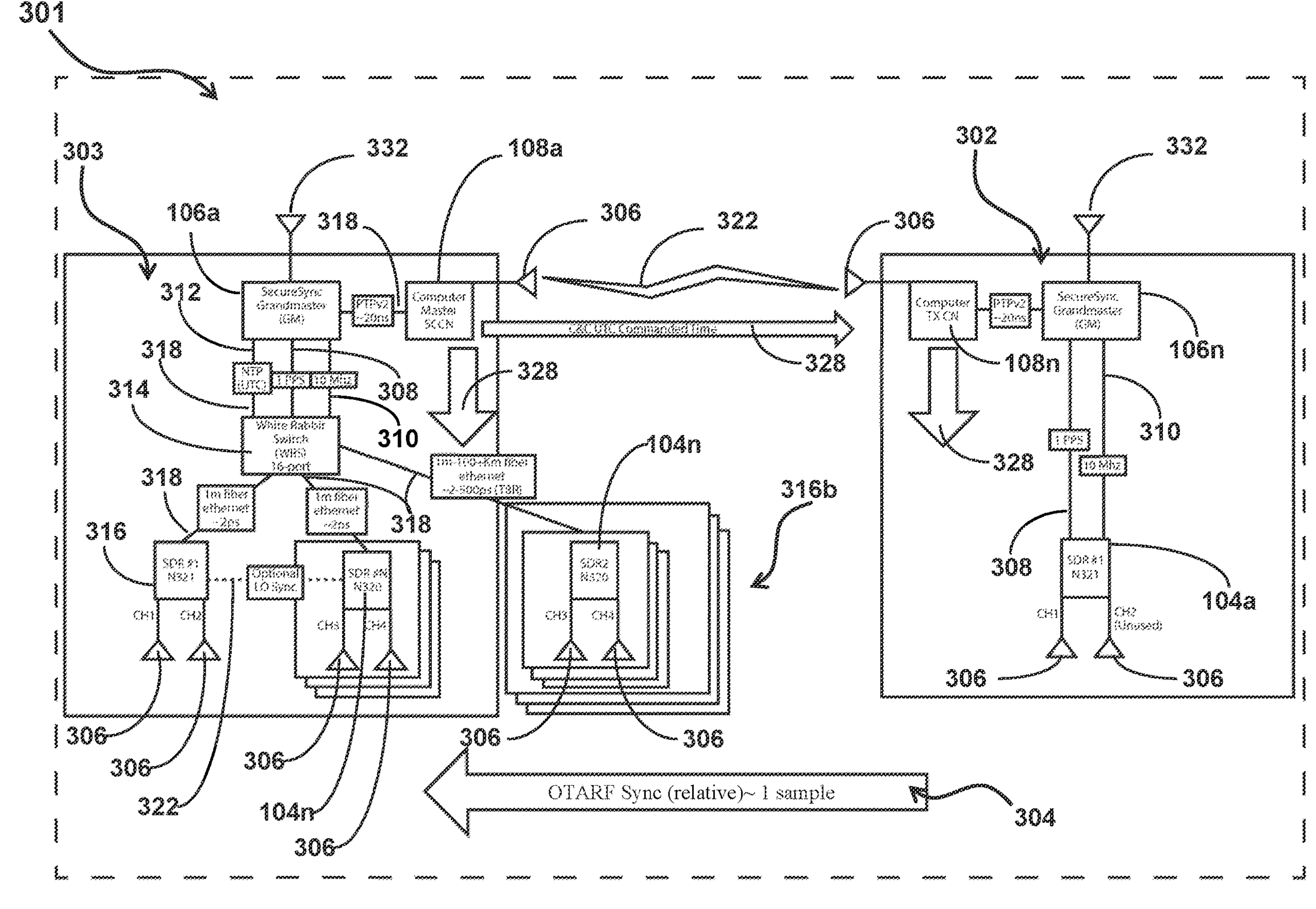
FIG. 3B shows an example of a noiseless time distribution network that employs both wired and wireless time-transfer channels for synchronizing the sensor nodes of the distributed system of FIG. 1, consistent with various embodiments.

FIG. 3B is a block diagram of an embodiment of a noiseless time distribution network 301 used to perform time synchronization and/or general communications operations. The noiseless timing distribution network 301 may refer to a communication network that includes at least one dedicated wired connection between components being synchronized thereby. This wired connection is dedicated to timing signal information and may be shielded from external noise or interference. Further, the noiseless wired connection may be augmented by additional wirelessly transmitted calibration signals which serve as temporal focusing elements that increase the synchronization fidelity. In some embodiments, the noiseless time distribution network 301 comprises two primary components, a master array node 303 and the transmitter node 302. The master array node 303 may be a plurality of sensor nodes 104*a*-104*n* that is configured into a zero hop master slave PTP network. The implementation of a dedicated TWTT channel 318 that creates a scalable zero hop network ensures that the load on the network and the number of hops in the topology do not reduce time synchronization resolution. In some embodiments, a primary grandmaster clock 332 functions as the source of absolute time for a primary master node 106*a*. The master node 106*a* then distributes time signal data to a time distribution interface 314 through the dedicated TWTT channel 318. In some embodiments, the dedicated TWTT channel 318 is a two-way communication link for time signal data. The system 100 may use dense wavelength-division multiplexing to enable the dedicated TWTT channel 318 to send and receive multiple simultaneous timing signals 308 (e.g., NTP, 1PPS, 10 MHz) over a single TWTT channel. In some embodiments, time signal data may be passed from the primary master node 106*a* to a time synchronization interface that employs an IEEE 1588-2019 time-transfer protocol to distribute time signal data to a plurality of local slave nodes 316*a*. Each of the plurality of local slave nodes 316*a* may include a plurality of antenna elements capable of receiving an OTA time calibration waveform 304 broadcast by the transmitter node 302. In some non-limiting embodiments, the distributed system 100 utilizes a plurality of transmitter nodes 302 and/or may contain a plurality of sensor nodes 104*a*-104*n* used for transmitting the OTA time calibration waveform 304. For example, the usage of the plurality of transmitter nodes 302 distributed throughout an area may enable the system to achieve greater time synchronization fidelity and/or introduce operational redundancy. The OTA time calibration waveform 304 is produced after the processor node 108*a* generates a master timing signal 328, that is distributed to the relevant control components of the noiseless time distribution network 301. The master timing signal may include a slave node listening window scheduling command, the OTA time calibration waveform 304, and/or the computed time offset between nodes. In some embodiments, a processor node 108*n* and secondary master node 106*n* are included in the transmitter node 302. This feedback loop enables the noiseless time distribution network 301 to continually update and refine the time synchronization fidelity. In some embodiments, the master node 106*a* synchronizes the plurality of slave nodes 316 with the master timing signal 328 being transmitted through a dedicated timing data channel 318 and the master processor node 108*a* then coheres said data. The cohering synchronized data signals from the plurality of slave nodes 316 generates a combined signal having a power level greater than a power level of any of the sensor nodes 104*a*-104*n*.

Continuing with FIG. 3B, embodiments of the distributed system may include a plurality of remote slave nodes that are positioned up to hundreds of km away from the primary master node and yet maintain a high timing precision and accuracy (e.g., a picosecond temporal resolution). In some embodiments, a fiberoptic cable is the input for the time synchronization interface 314, while the output is 1PPS/10 Mhz signals as well as PTP ethernet. This architecture allows for a plurality of remote slave nodes 316*b* to be disposed 1 m-100+km from the master node.

Figure 3C:
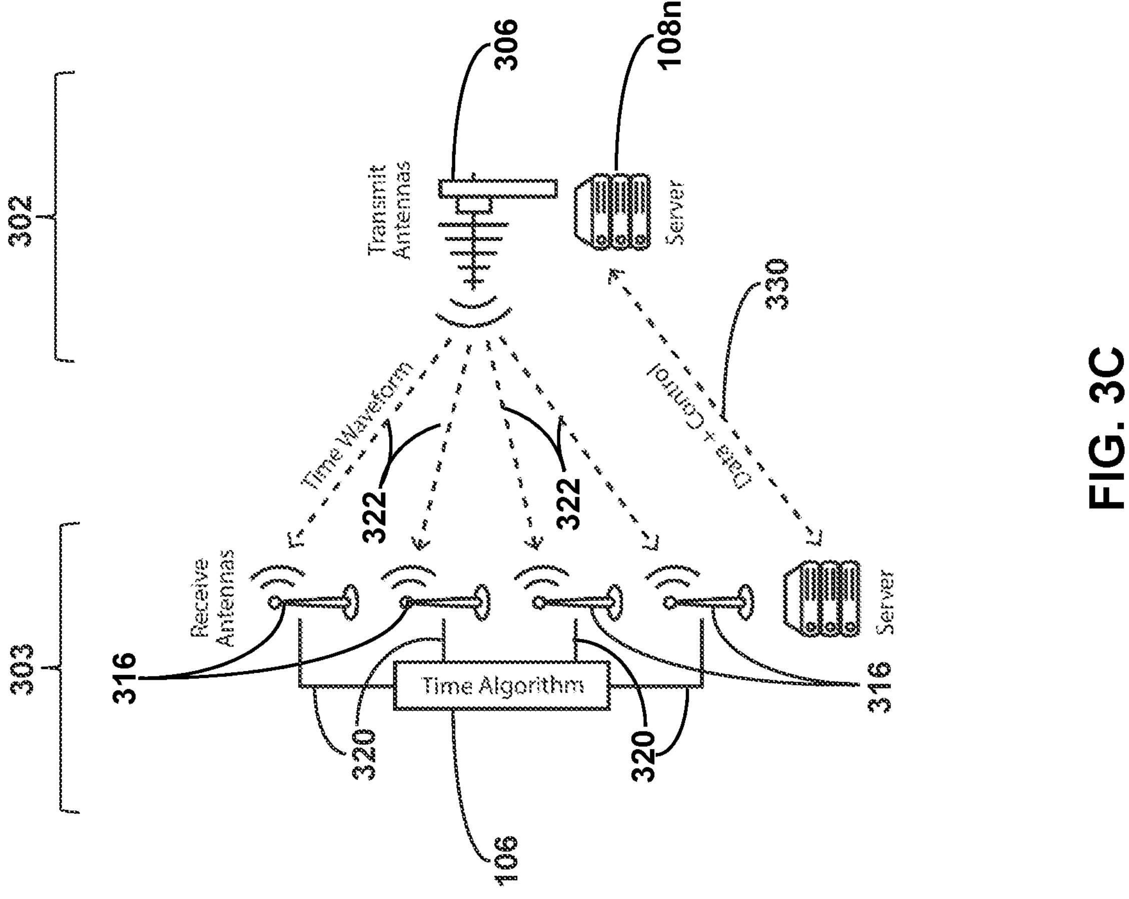
FIG. 3C shows an example of a noiseless time distribution network that combines a time synchronization protocol and over the air waveform synchronization for synchronizing the sensor nodes of the distributed system of FIG. 1, consistent with various embodiments.

In some embodiments, a plurality of sensor nodes grouped in a subarray may be resolved into a single node weight vector for signal processing. Accordingly, the node excitation data provided by a single node 104*a* may be representative of a plurality of slave nodes 316. In some embodiments, the noiseless time distribution network 301 includes an infrastructure of distributed redundant and calibrated atomic clocks, Global navigation satellite system (GNSS) time receivers, and fiber optic TWTT channels 318, whose references are scattered across up to hundreds of kilometers. In this way, the distributed system 100 will be able to obtain and maintain the fidelity of backbone time transfer components (e.g., a secured master reference node 106*a*, a primary grand master clock 332, and a master processor node 108*a*). This disposition enables the noiseless time distribution network 301 to distribute the time references available from a plurality of sensor nodes 104*a*-104*n* to positions experiencing a failure or under GNSS interference. In some embodiments, each of the plurality of slave nodes 316 is representative of a cluster of sensor nodes that is synchronized to a secondary master node 106*n* and/or grandmaster clock. Each of the cluster of slave nodes 316 may be connected to the secondary master node 106*n* through a corresponding secondary timing channel such that the secondary master node 106*n* is synchronized to the primary master node 106*a*. In some embodiments, the distributed system 100 may implement a scalable chain of master-slave node clusters that expand the operational capabilities. For example, the processor node 108*a* may recruit a plurality of subordinate sensor node clusters to perform a passive radar operation. Each of the subordinate sensor node clusters may be synchronized to its own subordinate master node and/or subordinate master clock. The subordinate master clock may be synchronized to the grandmaster clock 332 of the master array node 303. This architecture may enable the processor node 108 to implement a multi-hop network where the number of hops is calculated to achieve a desired system-wide time synchronization fidelity. The primary master node 106*a* and the slave nodes 316 may communicate through a bidirectional stateless connection. Further, the master array node 303 may implement boundary clocks and transparent clocks in the time synchronization interface 314 thereby enabling a plurality of timing network architectures. FIG. 3C is a block diagram of an embodiment of a TWTT synchronization operation where the master node 106 uses a plurality of wired TWTT channels 320 to connect the plurality of slave nodes 316. In some embodiments, the temporal focusing approach for multi-node networks greatly reduces time error by coordinating "one-to-many" instead of "one-to-one" negotiations. The one-to-many temporal focusing approach provides more data for averaging out error and increases precision of time difference of arrival (TDOA). Specifically, by measuring and then averaging timing offset and/or error for each of the plurality of slave nodes across a plurality of synchronization cycles, the processor node 108 is able to better understand and account for a true time offset for the plurality of slave nodes 104*a*-104*n* relative to the master node 106. For example, the master node 106 may perform longitudinal averaging of the time offsets to determine a true time offset over multiple synchronization cycles. Similarly, the master node 106 may calculate a time offset for each of the plurality of slave nodes 104*a*-104*n*, and average the time offsets to determine a true time offset of the distributed system 100. Further, the master node 106 may perform longitudinal averaging of the time offsets to determine a true time offset over multiple synchronization cycles. In other embodiments, the master node 106 performs spatial averaging of the time offsets to determine a true time offset across the plurality of slave nodes 104*a*-104*n* at any given time.

In some embodiments, true offset acquisition is managed by a machine learning algorithm that analyzes performance of the distributed system 100 to identify and address sources of network and/or processing latency. Thus, the distributed system adaptively responds to temporal, spatial, and computational deficiencies that decrease synchronization accuracy. In some embodiments, the master node 106 transmits the master timing signal 328 to the plurality of slave nodes 104*a*-104*n* via the wired TWTT channel 320 and the plurality of slave nodes 316 transmit responses via a wireless TWTT channel 322. Thus, the system 100 is designed to identify and employ the most advantageous means of time transfer messaging. For example, the master node 106 may transmit a time-stamped message directing each of the plurality of slave nodes 316 to transmit a slave timing signal at a future known time. When the slave timing signal is sent at the future known time and received by the master node 106, a difference between the future known time and a time of receipt by the master node 106 is used to calculate a node-specific time offset that correlates to a distance between the master node 106 and a corresponding slave node from the plurality of slave nodes 316.

In some embodiments (e.g., FIGS. 3B and 3C), data gathered or transmitted by each of the plurality of sensor nodes is transmitted to the processor node 108 via a data transfer channel 330. FIG. 3C depicts the noiseless time distribution network 301 in a zero-hop network configuration were there are no routers between a master node 106 and a slave node 316. This configuration facilitates the arbitrary node 106*n* calibrating the master array node 303 based on a true time delay between a plurality of antenna nodes (e.g., antenna data elements 306). Further, the true time delay may be the node-specific time offset for each of the plurality of slave nodes 316 on the noiseless timing distribution network 301. This node-specific time offset may be adaptively calculated to account for moving sensor nodes or changing conditions. For example, antenna nodes 104*a*-104*n* may be communicably coupled through at least one of a wired 320 connection or a wireless connection 322. In some embodiments each of the plurality of sensor nodes 104*a*-104*n* may be communicably coupled and synchronized with one another to enable phase-coherent channels for beamforming operations. Further, the processor 206 for each sensor node 104*a* (FIG. 2) may be synchronized via 1588 PTPv2. Data generated relating to command/control may be synchronized within double-digit nanosecond precision. The distributed system may be advantageously employed on a network of small, low-power nodes to create a communications network that has a low probability of detection/low probability of intercept (LPD/LPI) comms also fosters resiliency in contested environments, allowing for "stand-in" solutions.

Example Flowchart(s)

The example flowchart(s) described herein of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 4A:
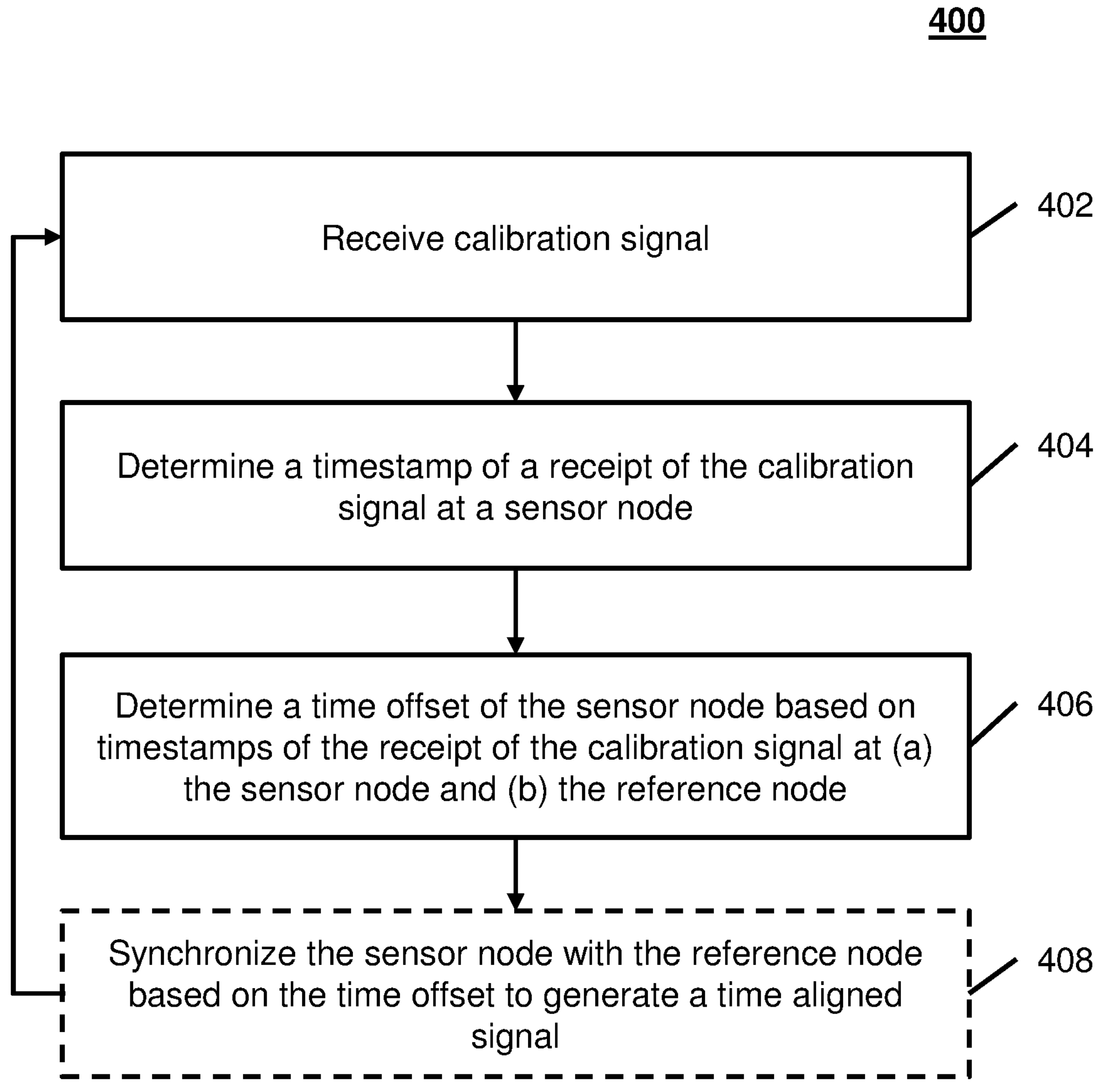
FIG. 4A shows a flowchart of a method for synchronizing sensor nodes in a distributed system with a calibration signal, consistent with various embodiments.

FIG. 4A shows a flowchart of a method 400 for synchronizing sensor nodes in a distributed system, consistent with various embodiments. The method 400 is one example of synchronizing sensor nodes in which the sensor nodes 104*a*-104*n* are synchronized with respect to a reference node in the distributed system using a calibration signal from a transmitter node. In some embodiments, the method 400 may be implemented in a sensor node, a reference node, or a central processing node of the distributed system 100. In an operation 402, a calibration signal from a transmitter node is received at each of the sensor nodes (e.g., receive sensor nodes), including a reference node. For example, a first sensor node 104*a*, a second sensor node 104*b* and a reference node 106 of the distributed system receives the calibration signal 304 from the transmitter node 302 (e.g., as described at least with reference to FIG. 3 above).

In an operation 404, a timestamp of a receipt of the calibration signal is determined by each of the sensor nodes 104*a*-104*n* (e.g., receive sensor nodes) and the reference node. For example, the first sensor node 104*a* determines a first timestamp of a receipt of the calibration signal 304 (e.g., based on the clock of the first sensor node 104*a*), the second sensor node 104*b* determines a second timestamp of a receipt of the calibration signal 304, and the reference node 106 determines a reference timestamp of a receipt of the calibration signal 304.

In some embodiments, the calibration signal 304 may be a transmit pulse of a specified duration (e.g., 10 to 1,000 microseconds long), in which case a sensor node may compress the receive timestamp into a single point of time. A signal may be compressed into a single point of time in a number of ways. For example, the first sensor node 104*a*-104*n* may use a matched filter (e.g., matched filter algorithm) to compress the calibration signal into a single point of time.

In an operation 406, a time offset of the sensor nodes with respect to the reference node is computed based on the timestamps of the receipt of the calibration signal at the corresponding sensor nodes 104*a*-104*n* (e.g., receive sensor nodes) and the timestamp of the receipt of the calibration signal at the reference node. In some embodiments, the time offset may be computed by a central processing node 108. The sensor nodes 104*a*-104*n* and the reference node 106 may transmit their corresponding timestamps to the central processing node 108, which may compute the timestamps. For example, consider that the reference timestamp of a receipt of the calibration signal 304 recorded by the reference node 106 is "1.00" nanoseconds, the first timestamp of a receipt of the calibration signal 304 recorded by the first sensor node 104*a* is "1.05" nanoseconds, and the second timestamp of a receipt of the calibration signal 304 recorded by the second sensor node 104*b* is "0.98" nanoseconds. The reference node 106, first sensor node 104*a* and second sensor node 104*b* transmit their corresponding timestamps to the central processing node 108. The central processing node 108 computes a first time offset for the first sensor node 104*a* by subtracting the reference timestamp ("1.00") from the first timestamp (e.g., "1.05") to obtain the first time offset (e.g., "1.05"−"1.00"="0.05" nanoseconds). Similarly, the central processing node 108 computes a second time offset for the second sensor node 104*b* by subtracting the reference timestamp ("1.00") from the second timestamp (e.g., "0.98") to obtain the second time offset (e.g., "0.98"−"1.00"="−0.02" nanoseconds). In some embodiments, the central processing node 108 may store these time offsets in a storage device (not illustrated) so that in the future when it receives data signals data from the first and second sensor nodes, the two sensor nodes may be synchronized by applying the corresponding time offsets to the data signals to generate time aligned data signals.

In some embodiments, the central processing node 108 may also consider time difference of arrival of the calibration signal 304 from the transmitter node 302 to the different sensor nodes 104*a*-104*n* for computing the time offsets. In some embodiments, the time difference in arrival is indicative of a difference between a time at which the calibration signal arrived at a specific sensor node and a time at which the calibration signal arrived at the reference node 106. If all the sensor nodes 104*a*-104*n* are co-located (e.g., within specified number of wavelengths of the calibration signal 304), the time difference of arrival of the speed of light is negligible, and so the time difference of arrival may also be negligible, and therefore, time difference of arrival calculation may not be necessary and computing the time offset based on the time stamps may be accurate. However, if the sensor nodes 104*a*-104*n* are not co-located (e.g., located beyond the specified number of wavelengths of the calibration signal 304), the time difference of arrival of the calibration signal 304 from the transmitter node 302 to the sensor nodes 104*a*-104*n* may also be calculated such that a sum of the time offset, the time difference of arrival and the timestamp are the same for all the sensor nodes 104*a*-104*n*. The time difference of arrival may be computed based on speed of light and the known location information of the transmitter node 302 or sensor nodes 104*a*-104*n*. As an example, if two nodes are exactly co-located but have a time difference of arrival of a calibration signal by 1 microsecond, then the time offset would be adjusted by 1 microsecond. On the other hand, if the sensor nodes are located 100 meters a part in the direction which the calibration/reference signal is travelling, equating to "333" nanoseconds at the speed of light. So, if the time difference of the signal arriving at the further node is "1,333" nanoseconds after the first/reference node, then the time offset would only be 1 microsecond to account for the distance offset.

Figure 5A:
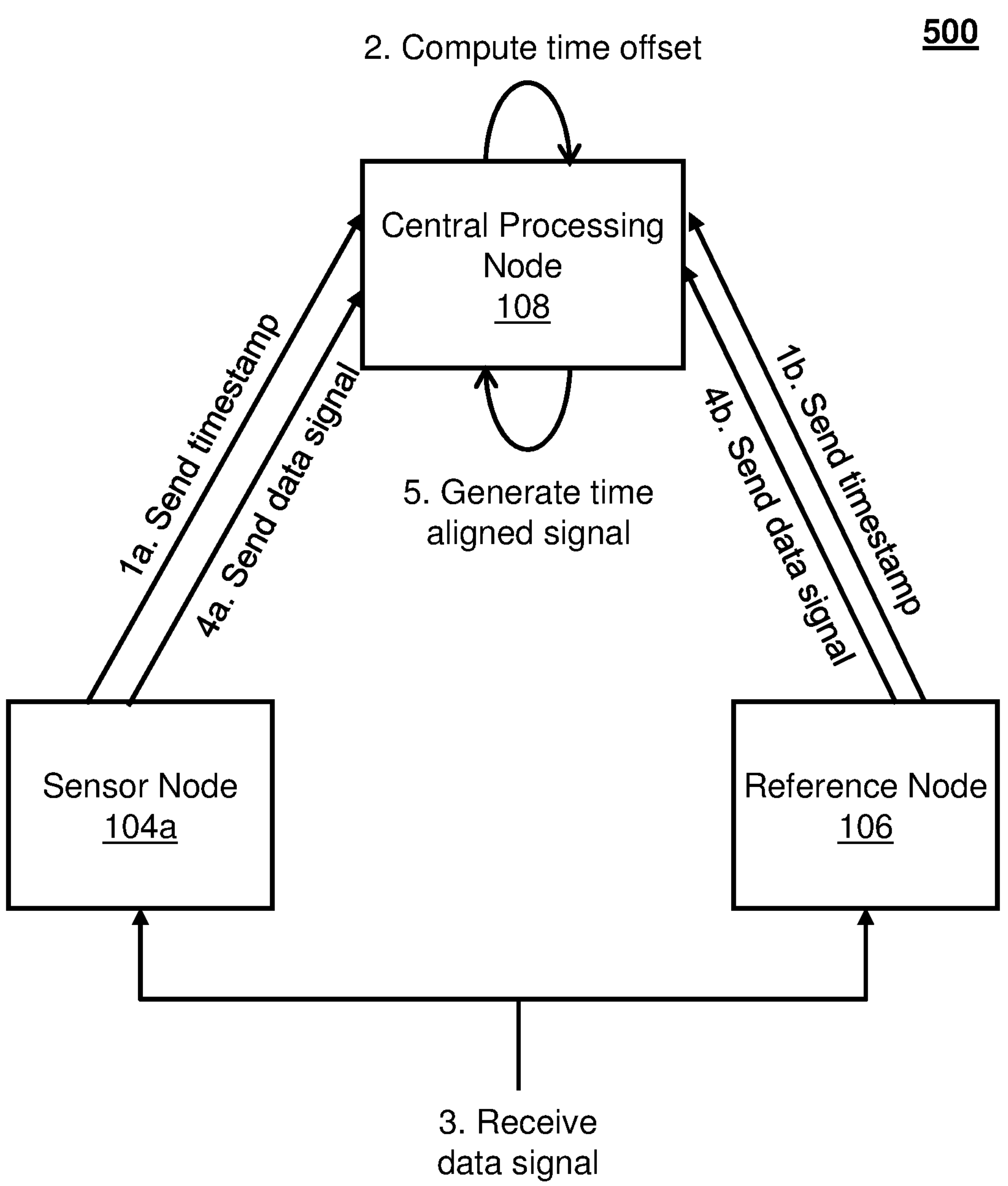
FIGS. 5A, 5B and 5C are block diagrams illustrating generation of time aligned data signals for the sensor nodes of the distributed system, consistent with various embodiments.
Figure 5B:
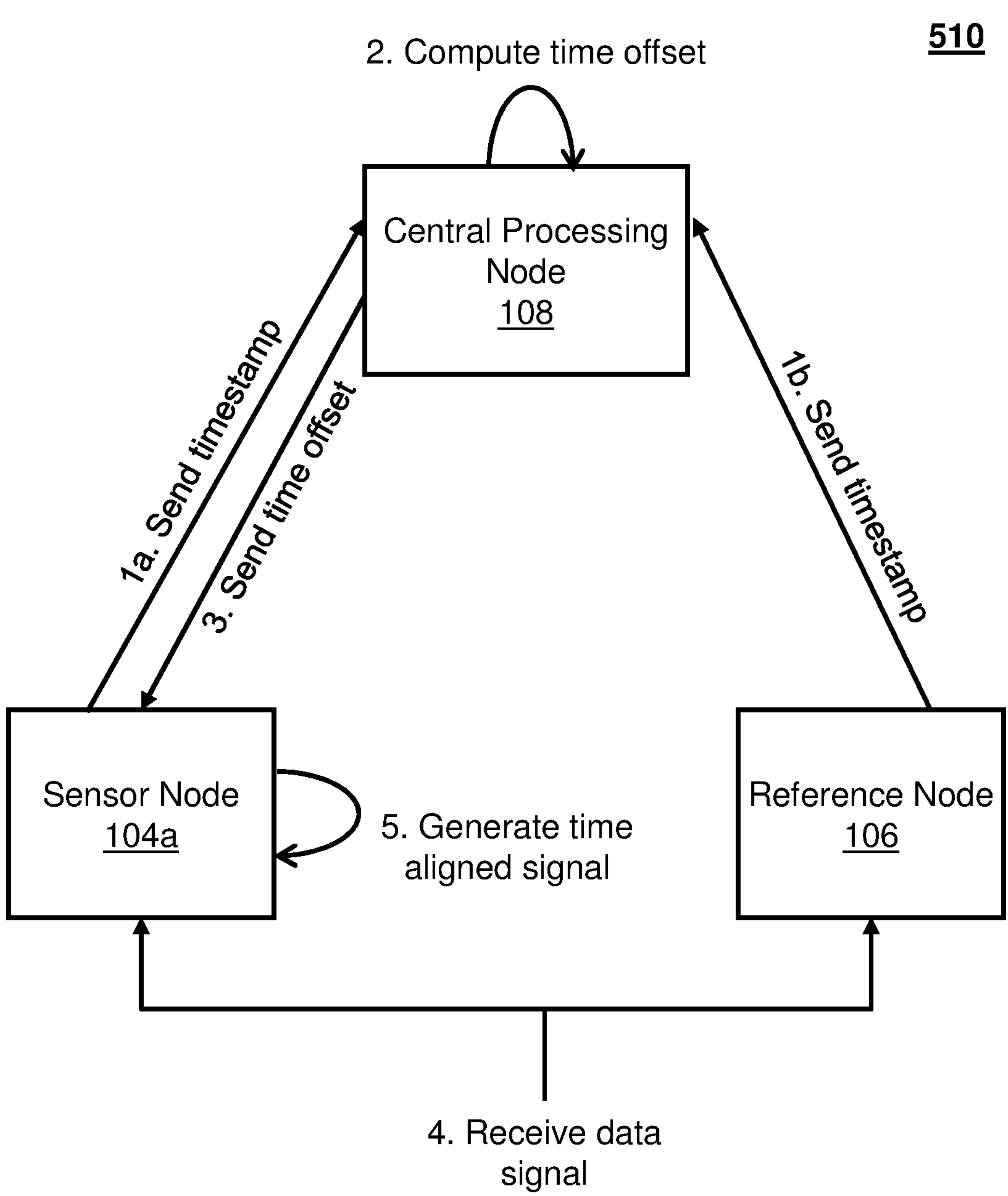
Figure 5C:
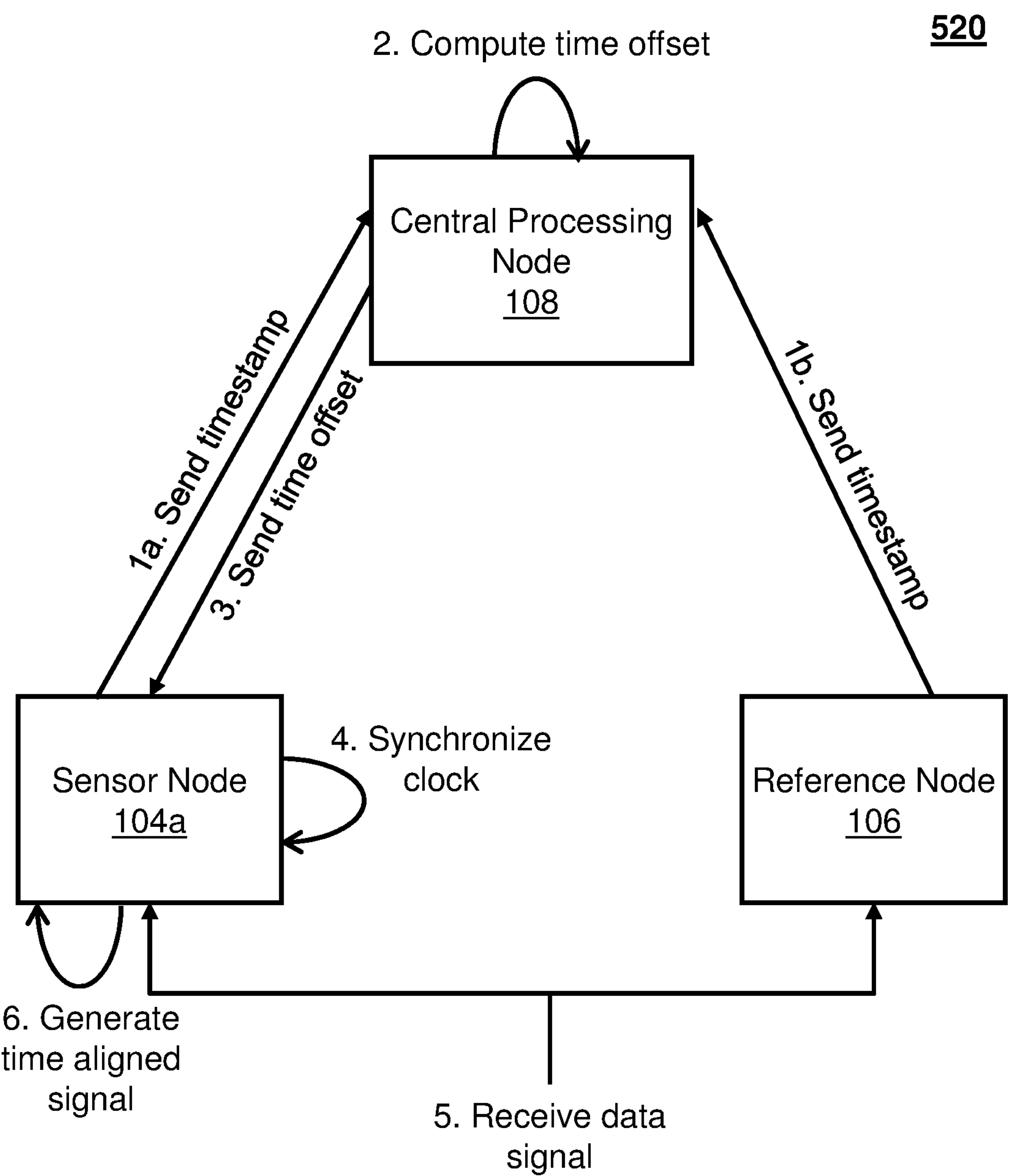

In an operation 408, the sensor nodes 104*a*-104*n* are synchronized based at least on the time offsets to generate a time aligned data signal for each of the sensor nodes 104*a*-104*n*. In some embodiments, a time aligned signal is a data signal that is aligned in time (e.g., and phase or amplitude) with the data signal received by other sensor nodes (e.g., the reference node 106). The time aligned data signals may be generated in various ways. FIGS. 5A-5C are block diagrams illustrating generation of time aligned data signals for the sensor nodes of the distributed system, consistent with various embodiments.

FIG. 4B shows a flowchart of a routine 410 for generating a master timing signal from the grandmaster clock 332 of the time transfer network that synchronizes the master array node 303 (FIG. 3B). The routine may include establishing, via the processor node 108*a*, a zero-hop network architecture between the plurality of sensor nodes 104*a*-104*n*, wherein each of the plurality of sensor nodes 104*a*-104*n* includes a dedicated TWTT channel 318 used to communicate with the master node 106*a* and other nodes in the distributed system 100 (412). The routine may include designating, via the processor node 108*a*, a master node 106*a* and a plurality of slave nodes 316, wherein the master node 106*a* communicates with the dedicated TWTT channel 318 for each of the plurality of slave nodes 104*a*-104*n* to form the master array node 303 within the noiseless timing distribution network 301 (414).

In some embodiments, the master node 106*a* performs diagnostic operations to assess a status and health of time synchronization accuracy between the master node 106*a* and the plurality of slave nodes 316, time-synchronization fidelity of the grandmaster clock 332 relative to both the master node and the plurality of slave nodes, a time offset and/or time deviation, and an achieved frequency deviation (FIG. 3B). The master node 106*a* may update a time synchronization schedule during the adaptive improvement. For example, the adaptive improvement may include generating, via the primary master node 106*a*, a synchronization window protocol, and communicating timing signal data with the plurality of slave nodes 104*a*-104*n* according to the synchronization window protocol (416). The synchronization window protocol generates precise instructions for each of the plurality of slave nodes 104*a*-104*n* that dictates when to begin listening for the timing signal data used to synchronize the time synchronization protocol implementation. The distributed system 100 is able to reduce processing overhead and improve time-synchronization fidelity by modifying the synchronization window protocol. For example, the slave node 316 may continually listen for timing signal data, and thus consume a substantial amount of system resources. Alternatively, the slave node 316 may listen for timing signal data during scheduled windows, according to the synchronization window protocol. In some embodiments, the slave node 316 adaptively determines when to listen for timing signal data, according to the synchronization window protocol. For example, the distributed system may recognize an unusual amount of latency and determine that the listening window should be modified to adjust for a damaged TWTT channel 318. The slave node 316 may disregard unwanted data captured during a listening window according to the synchronization window protocol, and thereby reduce processing and/or transmission overhead.

In some embodiments, the master node 106 monitors a primary clock drift for the grandmaster clock 332 and a secondary clock drift for corresponding slave clock (e.g. FIG. 2, clock 204) included in each of the plurality of slave nodes 316. The master node 106 may update a maser timing signal and modify the synchronization window protocol based on the primary clock drift. Further, the master node may resynchronize the slave node 316 if the secondary clock drift exceeds a desired threshold. Thus, the distributed system adapts to changing clock times and maintains sub-picosecond time synchronization accuracy.

In a first example 500 illustrated in FIG. 5A, all the sensor nodes 104*a*-104*n* (e.g., sensor nodes with receiving capability), such as the first sensor node 104*a*, and the reference node 106 transmit their timestamps of receipt of the calibration signal to the central processing node 108. For example, the first sensor node 104*a* transmits the first timestamp (e.g., "1.05" nanoseconds) and the reference node 106 transmits the reference timestamp (e.g., "1.00" nanoseconds) to the central processing node 108. Note that in the example of FIGS. 5A-5C, the reference node 106 and the central processing node 108 are shown as separate nodes. However, in other embodiments, the reference node 106 and the central processing node 108 may be the same sensor node. After receiving the timestamps, the central processing node 108 computes the first time offset for the first sensor node 104*a* as a difference between the first timestamp and the reference timestamp (e.g., "1.05"–"1.00"="0.05" nanoseconds). Similarly, the central processing node 108 computes the second time offset for the second sensor node 104*b* (not illustrated in FIG. 5A) as a difference between the second timestamp and the reference timestamp (e.g., "0.98"-"1.00"="–0.02" nanoseconds). The central processing node 108 may further store the first and second time offsets in a storage device (not illustrated) associated with the central processing node 108. When the sensor nodes and the reference node receive a data signal (e.g., a response to a probe signal transmitted by the sensor nodes and that is reflected off by an object such as an aircraft), the sensor nodes and the reference node transmit the received data signal to the central processing node 108. For example, the first sensor node 104*a* and the reference node 106 transmit the received first data signal and a reference data signal, respectively, to the central processing node 108. The central processing node 108 may then retrieve the first time offset from the storage device and apply it to the first data signal to generate a first time aligned data signal of the first sensor node 104*a*. Similarly, the central processing node 108 may apply the second time offset to the second data signal of the second sensor node 104*b* to generate a second time aligned data signal of the second sensor node 104*b*.

In some embodiments, generating a time aligned data signal may include equalizing the data signals received by the sensor nodes. Equalizing may be a process of adjusting at least one of phase, amplitude, and time offsets of data signals such that the received waveform at all sensor nodes have the same amplitude, phase and time offset characteristics. For example, equalizing the first data signal received by the first sensor node may include adjusting at least one of a phase, time or amplitude such that the first data signal is aligned in time, phase or amplitude with a data signal received by another node (e.g., the reference node). In some embodiments, only one of time offset, phase adjustment or amplitude adjustment may be applied to equalize the received data signals. Amplitude, phase, and time delay differences between the signals create errors in the beamforming and cohering the signals causing degradation in the coherent "gain." By equalizing the received data signals, the errors in the gain and beamforming pattern are minimized. Equalization may be performed via a finite impulse response (FIR) filter or an infinite impulse response (IIR) filter. In some embodiments, equalization is performed via the FIR. In some embodiments, the same FIR is used across multiple data signals thereby minimizing computing resources consumed in equalizing the data signals, unlike conventional systems where a FIR filter may be used for each received signal which can be compute intensive.

Accordingly, the central processing node 108 may generate the time aligned data signals by equalizing the received data signals as illustrated in the first example 500 of FIG. 5A.

In a second example 510 of FIG. 5B, each of the sensor nodes may generate their own time aligned data signal based on the time offset computed by the central processing node 108. For example, the first sensor node 104*a* and the reference node 106 transmit the first timestamp and the reference timestamp, respectively, to the central processing node 108. The central processing node 108 computes the first time offset of the first sensor node 104*a* based on the first timestamp and the reference timestamp (e.g., as described above at least with reference to FIG. 5A) and transmits the first time offset to the first sensor node 104*a*. When the sensor nodes receive a data signal (e.g., a response to a probe signal transmitted by the sensor nodes, the response being reflected off an object such as an aircraft), the sensor nodes generate time aligned signals based on their received time offsets. For example, when the first sensor node 104*a* receives the first data signal, the first sensor node 104*a* may apply the received first time offset to the first data signal to generate a first time aligned data signal of the first sensor node 104*a*. The reference node 106 receives the data signal as well. In some embodiments, the first sensor node 104*a* generates the first time aligned data signal by applying a "true time delay" using its DSP 206 to the first data signal.

In a third example 520 of FIG. 5C, the sensor nodes 104*a*-104*n* synchronize their local clocks based on the received time offsets so that when the data signal is received at the sensor nodes, the data signals of the sensor nodes 104*a*-104*n* are time aligned. For example, the first sensor node 104*a* and the reference node 106 transmit the first timestamp and the reference timestamp, respectively, to the central processing node 108. The central processing node 108 computes the first time offset of the first sensor node 104*a* based on the first timestamp and the reference timestamp (e.g., as described above at least with reference to FIG. 5A) and transmits the first time offset to the first sensor node 104*a*. The first sensor node 104*a* synchronizes its local clock based on the received first time offset such that clock of the first sensor node 104*a* is now synchronized with the clock of the reference node 106. When the sensor nodes receive a data signal (e.g., a response to a probe signal transmitted by the sensor nodes, the response being reflected off an object such as an aircraft), the timestamps (of the receipt of the data signal) recorded at the sensor nodes 104*a*-104*n* are the same as the reference node 106 since the clocks are synchronized to the reference node 106, and therefore, the data signals of the sensor nodes 104*a*-104*n* are time aligned. For example, when the first sensor node 104*a* and the reference node 106 receive the data signal, the timestamp (of the receipt of the data signal) recorded at the first sensor node 104*a* is the same as the timestamp (of the receipt of the data signal) recorded at the reference node 106 since the clock of the first sensor node 104*a* is synchronized to the reference node 106, and therefore, the data signal of the first sensor node 104*a* is time aligned with the data signal of the reference node 106.

While the foregoing paragraphs describe the operations being performed with respect to a single sensor node (e.g., the first sensor node 104*a*), the operations 402-408 and the operations described with reference to FIGS. 5A-5C may be performed for all sensor nodes 104*a*-104*n* in the distributed system 100 that have the capability to receive waveforms. Further, while the foregoing paragraphs describe the operations (e.g., time synchronization) being performed by a single sensor node, such as the central processing node 108, the operations may be performed by another sensor node, such as the reference node 106, or by more than one sensor node. For example, any number of sensor nodes may perform the time synchronization or time alignment of data signals in the case where processing is done in a distributed way. Furthermore, the time synchronization (e.g., operations 402-406 for computing the time offsets) can be performed on a scheduled basis, prior to transmitting a probe signal, or prior to receiving the data signal.

Figure 6:
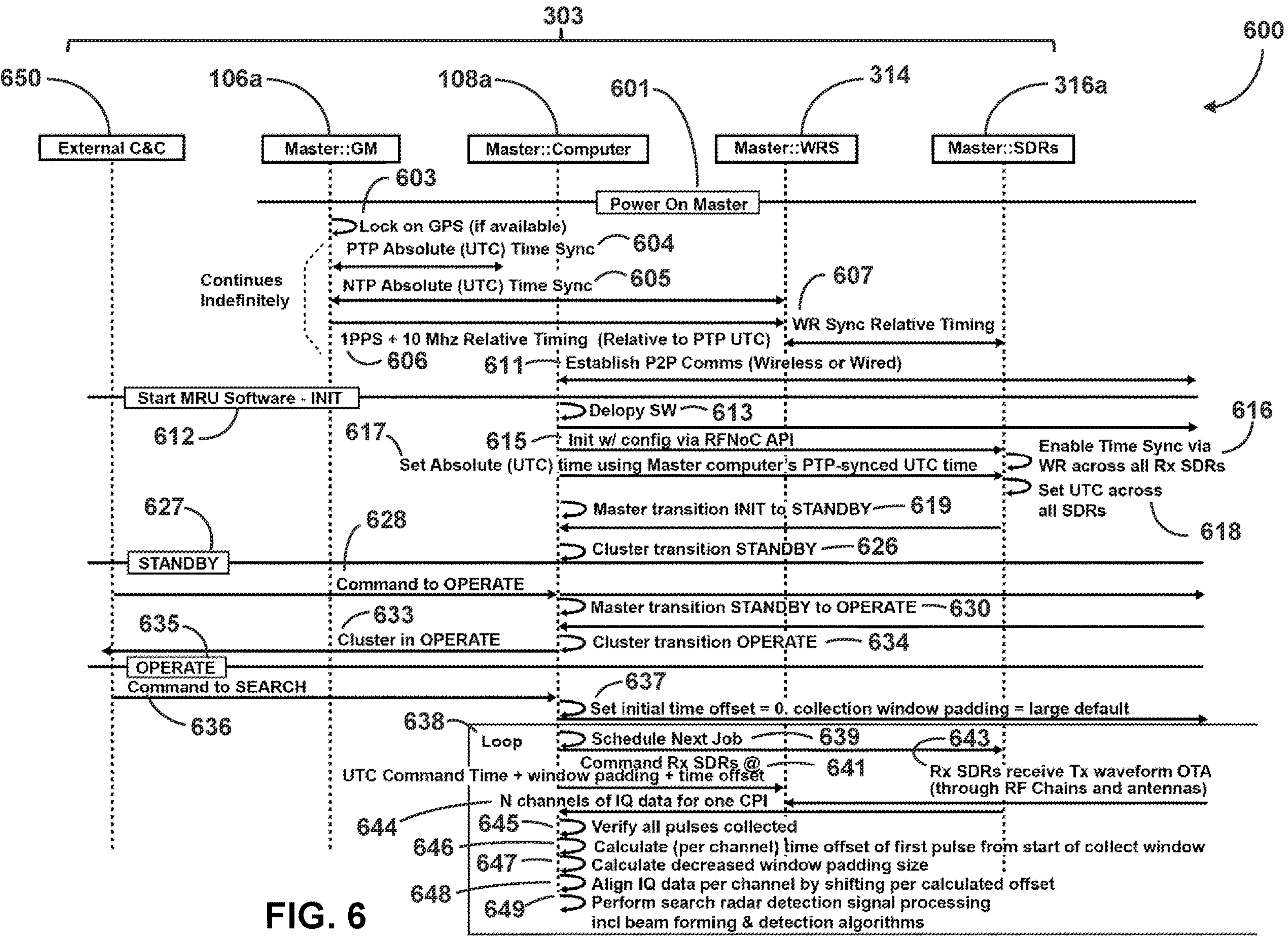
FIG. 6 shows a flowchart of a method for initializing a two-way time transfer protocol that uses a dedicated transmitter node to execute a temporal focusing operation when synchronizing the sensor nodes of the distributed system of FIG. 1, consistent with various embodiments.
Figure 6:
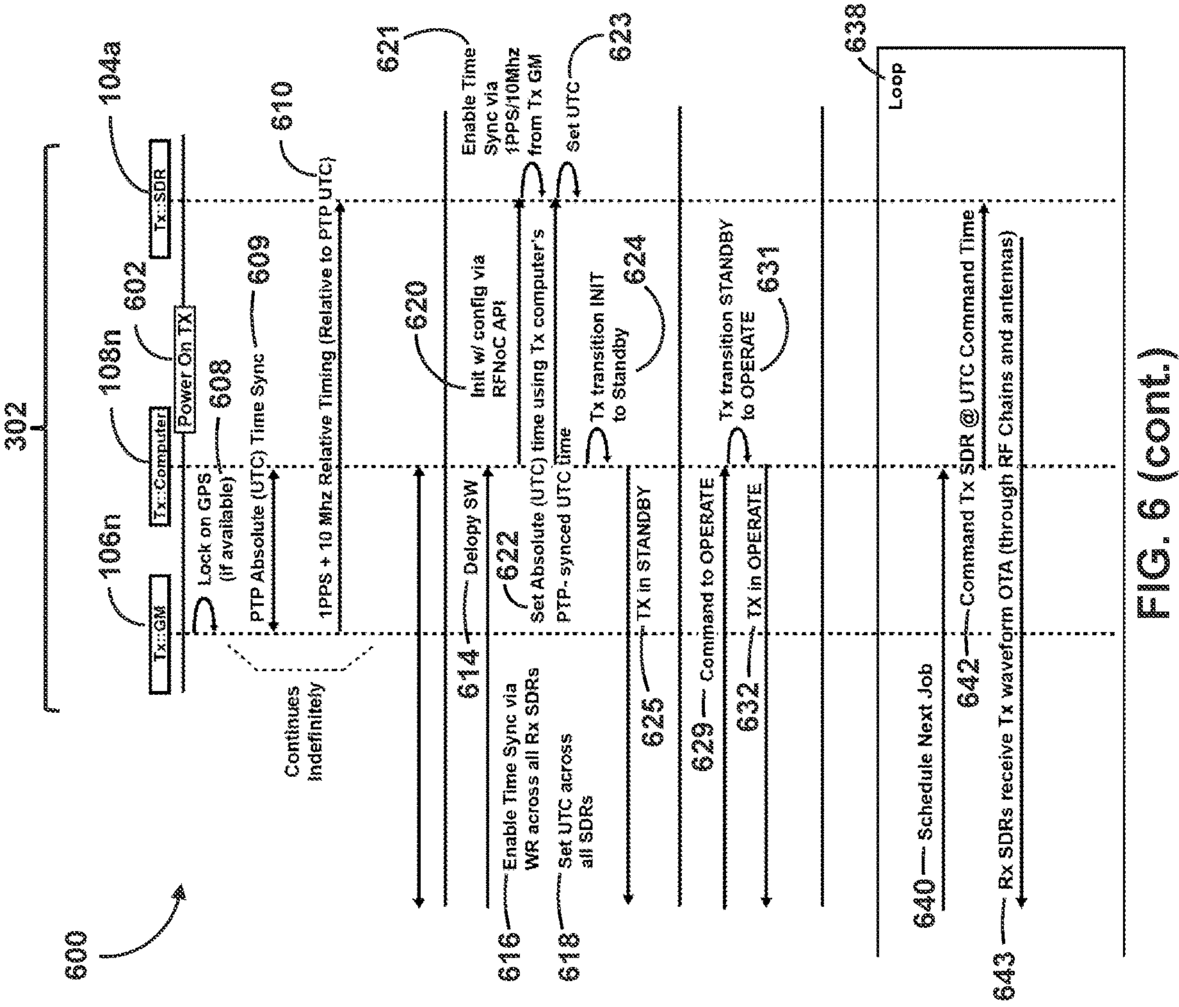

FIG. 6 shows a timing sequence diagram for synchronization between the master array node 303 and the transmitter node 302. The synchronization begins at operations 601 and 602 where the primary master node 106*a* and the secondary master node 106*b* are powered on. Synchronization operations 603 and 604 are mirrored by operations 608 and 609 which enable the primary master node 106*a* and the secondary master node 106*b* to acquire a time signal from a grandmaster clock 332. In operation 605 the master processor node 108*a* uses the grandmaster time signal to synchronize time distribution interface 314. Operations 606, 607, and 608 enable the components of the master array node 303 and the transmitter node 302 to be internally synchronized before establishing an intercomponent communication channel in operation 611. Further, operations 603-610 may be repeated indefinitely until the system 100 is powered off. Operations 612 initializes the temporal focusing routine where the calibration signal from the transmitter node 302 is used to further improve the time synchronization fidelity of the distributed system 100. Operations 613, 614, 615, 616, 617, 618, and 619 are used to synchronize the plurality of slave nodes 316 and the WRS 314 with the master processor node 108*a*. Likewise, operations 620, 621, 622, 623, and 624 are used to synchronize an arbitrary node 104*a* with the secondary processor node 108*n*. At operation 625 the secondary processor node 108*b* transmits the calibration signal 304 before transitioning into a standby state in operation 626. Standby operation 627 may persist until a command is received from an external control system 650 (e.g., the internet a user device, etc.) during operations 628 and 629. Operations 630, 631, and 632 enable the master processor node 108*a* to be recalibrated with respect to the secondary processor node 108*b* once the activation command is received. In operations 633, 634, and 635, the distributed system 100 continues in the operational stage and may periodically report system data to the external control system 650. Operation 636 may include a command that transitions the system 100 into a listening loop 638 through operation 637. Operations 639, 640, 641, 642, 643, and 644 describe a process for resynchronizing the components of the master array node 303 relative to the master processor node 108*a*, the components of the transmitter node 302 relative to the secondary processor node 108*n*, and the master array node 303 relative to the transmitter node 302. Operations 645, 646, 647, 648, and 649 are routines for using the recalibrated system time as feedback to improve system operation.

In some embodiments, cohering time aligned data signals from sensor nodes of a distributed system may be implemented using the central processing node 108 of the distributed system 100. The time aligned data signals of the sensor nodes 104*a*-104*n* are obtained. In some embodiments, the time aligned data signals are generated as described at least with reference to FIGS. 4 and 5A-5C above. For example, the central processing node 108 may generate the time aligned signals of the sensor nodes 104*a*-104*n* based on the corresponding time offsets of the sensor nodes 104*a*-104*n* or obtain the time aligned signals from the sensor nodes 104*a*-104*n*.

The time aligned signals may be cohered (e.g., added) to generate a combined signal. The combined signal may have a coherent gain such that power level of the combined signal may be a function of the individual time aligned signals being combined. For example, the power level of the cohered signal is a sum of the power levels of the individual time aligned signals of the different sensor nodes. In another example, the power level of the cohered signal is greater than the power levels of any of the individual time aligned signals of the different sensor nodes. In some embodiments, the cohering of the time aligned data signals is performed by the central processing node 108. In some embodiments, the sensor nodes perform the cohering of the time aligned signals (e.g., in a daisy chain format), instead of all sensor nodes 104*a*-104*n* sending their time aligned signals to a central processing node 108 for combining of all the time aligned signals. For example, a "binary" tree algorithm may be used for combining, where a the first sensor node 104*a* combines the time aligned signal with the second sensor node 104*b* to generate a first cohered signal, a third sensor node 104*c* combines with a fourth sensor node 104*a*-104*n* to produce a second cohered signal, and then the second sensor node 104*b* shares the first cohered signal with the fourth sensor node 104*a*-104*n* and the fourth sensor node 104*a*-104*n* combines the first cohered signal with the second cohered signal to generate a third cohered signal and so on.

In some embodiments, the cohered or the combined signal may then be processed for a desired application. For example, the combined signal may be used in a radar application to signals emitted from an object (e.g., aircraft) for measuring one or more parameters related to the object (e.g., distance or speed of the aircraft). The processing of the cohered signal may be performed by the distributed system 100 or by a third-party system in which case the cohered signal is provided as an input to the third-party system.

Figure 7A:
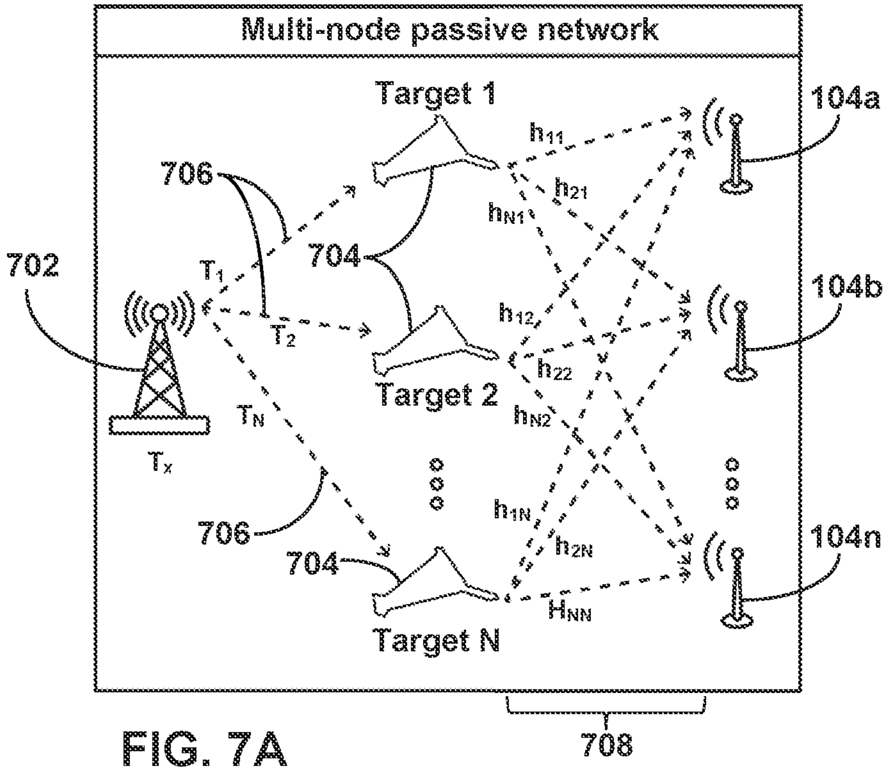
FIG. 7A is a block diagram of a passive radar system implemented using the distributed system of FIG. 1, consistent with various embodiments.

FIG. 7A shows a block diagram of a multistatic passive radar network used for blind channel estimation of the positions, velocities, and headings of a plurality of targets 704. In this passive radar network, the plurality of sensor nodes 104*a*-104*n* listens to ambient electromagnetic signals 708 to determine relevant characteristics of the target 704. The distributed system may employ a blind-channel estimation methodology for passive sensing with unknown reference signal(s) or a transmitter signal 706 in coherent distributed radar networks. In some embodiments, the distributed system 100 implements a super sampling regime that generates a plurality of digital snapshots of the node excitation data for each of the plurality of SDR sensor nodes 104*a*-104*n*. Because the sensor nodes 104*a*-104*n* employ SDR, it is trivial to digitally reproduce any snapshot of array data. In some embodiments, the distributed system 100 may combine digital snapshotting to perform super sampling with picosecond time synchronization to overcome current time synchronization limitations of passive radar systems. The distributed system 100 may be configured as a multistatic radar system that uses the aforementioned temporal focusing approach to reduce the time error associated with blind channel estimation for passive multi-target detection. For example, the distributed system 100 may employ open-design, low-cost COTS SDRs, the time synchronization protocol, and the time synchronization waveforms and algorithms. The distributed system may further execute long range detection. The resiliency of these systems depends in large part on their ability to avoid detection by adversaries. In contrast to active systems, which emit large electromagnetic pulses, passive systems have near-zero electromagnetic signatures and are therefore extremely difficult for adversaries to detect and thus more conducive to placement in contested environments.

In scenarios involving some limited knowledge of reference signal(s); during active bistatic operation, the distributed system 100 may leverage a priori knowledge of the transmitter 702 characteristics to perform radar processing without the need for direct path signals from the transmitter 702. For example, the distributed system 100 may exploit a priori knowledge of non-cooperative transmitters 702 (e.g., acquired through ELINT) wherever possible to improve the passive radar solution. Further, the system 100 may operate as a passive when possible architecture where any number of sensor nodes transitions between active operations and passive sensing to respond to threats and/or changing environmental conditions.

Figure 7B:
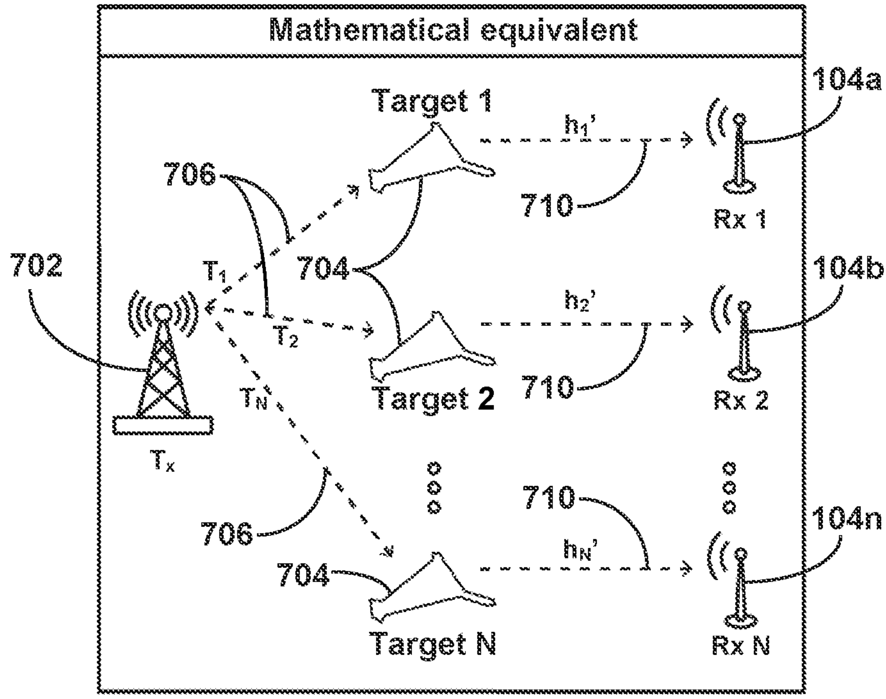
FIG. 7B is a block diagram of successful passive radar target acquisition using the distributed system of FIG. 1, consistent with various embodiments.

As shown in FIG. 7B, passive systems (e.g., 104*a*-104*n*) must operate with limited or no knowledge of the transmitter(s) 702 and channel characteristics. This can severely complicate the effort of correlating sensor waveforms to accurately detect and track targets 704. Extraction of the signal demands a very clean "reference signal," which describes a plurality of unreflected transmitter waveforms 706. If the transmitter signal 706 is unknown, it must be measured, which typically demands a line-of-sight to the transmitter and a directional antenna. In addition, processing gain suffers because the waveform 706 that is transmitted is not optimized for radar. The signal detection issues are compounded in in environments with large amounts of clutter and/or multiple non-cooperative transmitters. These issues render the correlation of signals obtained from multiple receivers computationally intractable. In some embodiments, the distributed system 100 employs a method by which a passive distributed radar system could detect multiple targets 704 with an unknown transmitter 702 location and unknown channel characteristics with a high probability of detection. For example, given the unknown transmitter 702 location, the number of targets 704 could be detected as the number of receive nodes 104*a*-104*n* available using a blind channel estimation method. As long as the passive receive nodes 104*a*-104*n* are sufficiently networked such that the signal data received at Rx1, y1 and the signal received at Rx2, y2 can be shared with each other to a sufficient time resolution, a plurality of representative signals 710 (e.g., channels, h1' and h2') can be sufficiently estimated to solve for accurate target 704 detections. In some embodiments, the time synchronization and temporal focusing approach allow time error to approach zero and therefore allow for the establishment of a tactically relevant passive distributed radar system. Further, the system may implement machine learning algorithms to refine a MIMO radar system to demonstrate blind channel estimation with precision time synchronization for operationally relevant conditions.

Referring to FIGS. 3B and 7B, some embodiments of the passive radar protocol may include sharing, by each of the plurality of sensor nodes 104*a*-104*n*, status information of a corresponding sensor node 104*b* with the sensor array system (e.g., distributed system 100). The passive radar protocol may further include synchronizing the plurality of sensor nodes 104*a*-104*n* based on the status information of the plurality of sensor nodes 104*a*-104*n* used to synchronize data signals received or transmitted by the plurality of sensor nodes 104*a*-104*n*. The passive radar protocol may further include generating, via the primary master node 106*a*, a corresponding master timing signal 328 for each of the plurality of slave nodes 316 (FIG. 3B). The passive radar protocol may further include communicating, via the primary master node 106*a*, the corresponding master timing signal (master timing signal 328) for each of the plurality of slave nodes 316 through a corresponding timing data channel (e.g., dedicated TWTT channel 318). In some embodiments, the primary master node 106*a* resynchronizes the plurality of slave nodes 316 to retain a picosecond temporal resolution. Further, the plurality of slave nodes 316 and/or the processor node 108 may perform adaptive angle of arrival tuning on passively received signals to determine a position, a heading, and a speed of at least one target 704. In some embodiments, synchronization operations account for target velocity and gravitational field data when operating at relativistic scales.

In another example where the distributed system 100 is configured to synchronize the sensor nodes 104*a*-104*n* using a calibration signal, the distributed system 100 synchronizes each of the sensor nodes 104*a*-104*n* with a reference node 106 of the distributed system 100 by computing a time offset between a timestamp of a receipt of a calibration signal at a reference node 106 of the distributed system 100 and a timestamp of receipt of the calibration signal at the corresponding sensor node, as described at least with reference to FIGS. 3-5.

In some embodiments, after synchronizing the sensor nodes 104*a*-104*n*, the time aligned signals are cohered (e.g., added) to generate a combined signal, which may be further processed for a desired application, as described at least with reference to FIG. 6 above.

Figure 8:
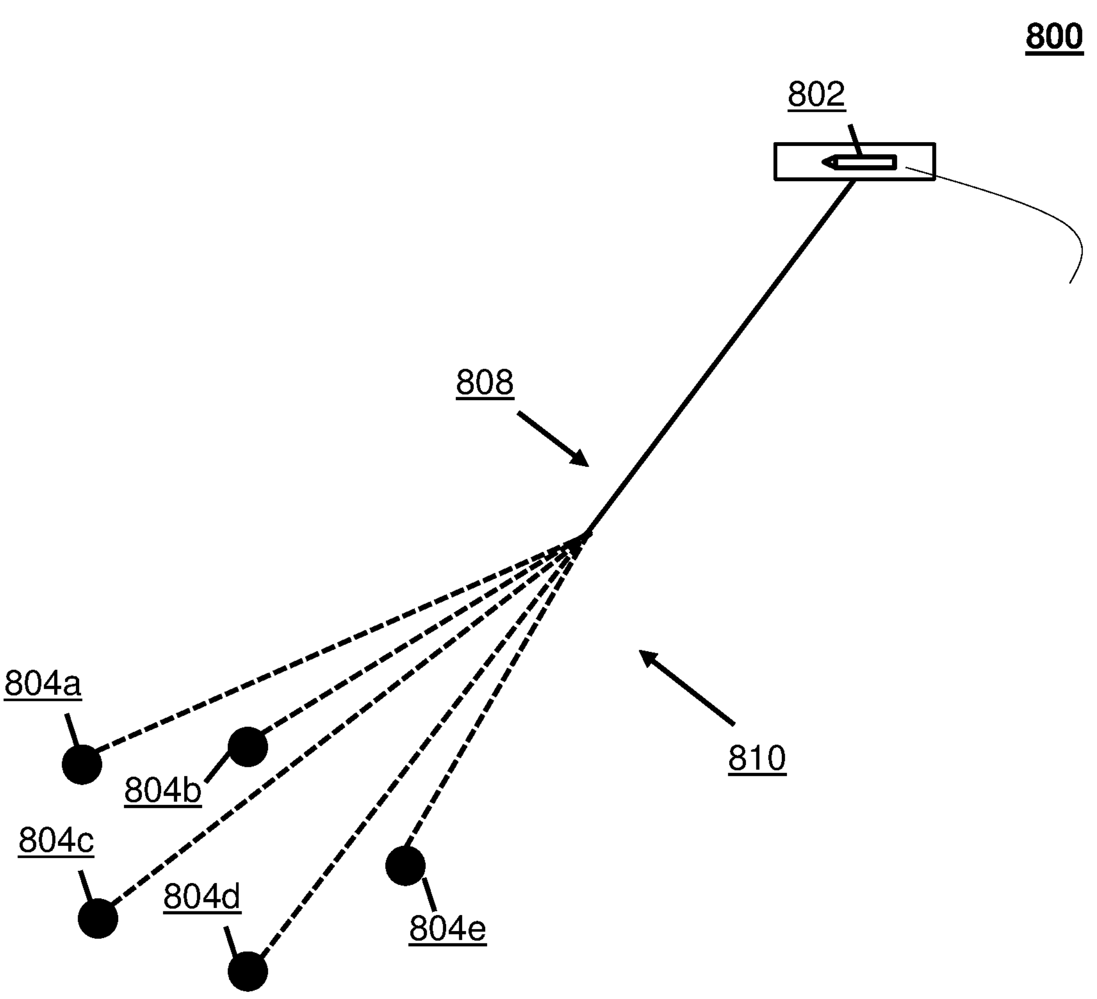
FIG. 8 is a block diagram of a radar system implemented using the distributed system of FIG. 1, consistent with various embodiments.

FIG. 8 is a block diagram of a radar system 800 implemented using a distributed system of FIG. 1, consistent with various embodiments. The radar system 800 includes a number of sensor nodes (e.g., sensor nodes 804*a*, 804*b*, 804*c*, 804*d* and 804*e*) that are configured to facilitate surveillance of a moving object (e.g., detection of an aircraft 802). In some embodiments, the sensor nodes 804*a*-804*e* are similar to the sensor nodes 104*a*-104*n* of the distributed system 100. In some embodiments, one of the sensor nodes 804*a*-804*e* may be designated as a reference node and a central processing node. In some embodiments, all the sensor nodes 804*a*-804*e* are configured as transmit and receive sensor nodes. The sensor nodes 804*a*-804*e* may be time synchronized as described at least with reference to FIGS. 4 and 5A-5C above. Further, the time aligned signals may be cohered as described at least with reference to FIG. 6 above. The radar system 800 may be configured to work in a wide range of frequencies.

The sensor nodes 804*a*-804*e* are configured to transmit a probe signal 808 in a beamforming pattern. The signals reflected from the aircraft 802 may be received by the sensor nodes as data signals 810. The data signals 810 are time aligned, cohered, and processed to determine one or more parameters of the aircraft 802 (e.g., distance or speed of the aircraft).

While FIG. 8 shows a single cluster of sensor nodes 804*a*-804*e*, the radar system 800 may have several clusters. In some embodiments, each black dot in FIG. 8 may be a cluster of sensor nodes. For example, the black dot 804*a* can be a first cluster, the block dot 804*b* can be a second cluster and so on each of which includes several sensor nodes. In some embodiments, such a configuration enables detection of a moving object at ultra-long range and high speeds. In some embodiments, the sensor nodes or clusters may be spread over a few hundred meters.

The distributed system 100 may also be implemented as a mobile sensor array system. For example, the sensor nodes 104*a*-104*n* may be designed as mobile sensor nodes that is battery powered, solar powered, etc. and may be installed in an automobile, an unmanned aerial vehicle (UAV), or other mobile devices.

While FIG. 8 describes implementation of the distributed system 100 as a radar system, the distributed system 100 may also be implemented as a sonar system to facilitate surveillance of objects moving underwater (e.g., a submarine). For example, the sensor nodes 104*a*-104*n* may be configured as hydrophone sensor nodes, which can be installed as buoys or as mobile hydrophones (e.g., in submarines). The hydrophone sensor nodes may be associated with above water components that communicate with satellites and has GPS capability.

In yet another example, the distributed system 100 may be implemented for oil and gas and mining industry to facilitate detection of oil (or any other energy) and metals. For example, the sensor nodes 104*a*-104*n* may be configured to work with seismic or acoustic waveforms and the cohered signals may be used to detect oil (or any other energy) and metals.

In some embodiments, the various components or modules illustrated in the Figures or described in the foregoing paragraphs may include one or more computing devices that are programmed to perform the functions described herein. The computing devices may include one or more electronic storages, one or more physical processors programmed with one or more computer program instructions, and/or other components. The computing devices may include communication lines or ports to enable the exchange of information within a network or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices. Cloud components may include control circuitry configured to perform the various operations needed to implement the disclosed embodiments. Cloud components may include cloud-based storage circuitry configured to electronically store information. Cloud components may also include cloud-based input/output circuitry configured to display information.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein. The processors may be programmed to execute computer program instructions by software; hardware; firmware; some combination of software, hardware, or firmware; and/or other mechanisms for configuring processing capabilities on the processors.

It should be appreciated that the description of the functionality provided by the components or modules described herein is for illustrative purposes, and is not intended to be limiting, as any of the components or modules may provide more or less functionality than is described. For example, one or more of the components or modules may be eliminated, and some or all of its functionality may be provided by other ones of the components or modules. As another example, additional components or modules may be programmed to perform some or all of the functionality attributed herein to one of the components or modules.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1: A method for two-way time transfer in a coherent sensor array system may include: establishing, via a processor node, a zero-hop network architecture between a plurality of sensor nodes, where each of the plurality of sensor nodes includes a dedicated two-way time transfer (TWTT) channel; designating, via the processor node, a master node and a plurality of slave nodes, where the master node communicates with the dedicated TWTT channel for each of the plurality of slave nodes to form a noiseless timing distribution network; and distributing, via the master node, a master timing signal from a grandmaster clock, where the grandmaster clock achieves at least a picosecond time-synchronization fidelity between the master node and the plurality of slave nodes in the noiseless timing distribution network.

2: The method as Embodiment 1 describes, where the master node performs diagnostic operations to assess a status and health of time synchronization accuracy between the master node and the plurality of slave nodes, time-synchronization fidelity of the grandmaster clock relative to both the master node and the plurality of slave nodes, a time offset and/or time deviation, and an achieved frequency deviation.

3: The method as either of Embodiment 1 or 2 describe, where the master node uses the status and health of time synchronization accuracy as training data for a machine learning algorithm that adaptively improves time synchronization of the noiseless timing distribution network.

4: The method as any of Embodiments 1-3 describe, where the master node updates a time synchronization schedule during the adaptive improvement.

5: The method as any of Embodiments 1-4 describe, where results of the diagnostic operations are reported as a function of time to the master node during the adaptive improvement.

6: The method as any of Embodiments 1-5 describe, where the master node calculates a time offset for each of the plurality of slave nodes, and where the master node averages the time offsets to determine a true time offset.

7: The method as any of Embodiments 1-6 describe, where the master node performs longitudinal averaging of the time offsets to determine a true time offset over multiple synchronization cycles.

8: The method as any of Embodiments 1-7 describe, where the master node performs spatial averaging of the time offsets to determine a true time offset across the plurality of slave nodes at any given time.

9: The method as any of Embodiments 1-8 describe, where the master node transmits the master timing signal to the plurality of slave nodes via a wired TWTT channel and the plurality of slave nodes transmit responses via a wireless TWTT channel.

10: The method as any of Embodiments 1-9 describe, where the master node transmits a time-stamped message directing each of the plurality of slave nodes to transmit a slave timing signal at a future known time, and where the slave timing signal is sent at the future known time and received by the master node, and where a difference between the future known time and a time of receipt by the master node is used to calculate a node-specific time offset that correlates to a distance between the master node and a corresponding slave node from the plurality of slave nodes.

11: The method as any of Embodiments 1-10 describe, where the processor node calibrates a phased array based on a true time delay between a plurality of antenna nodes, and where the true time delay is the node-specific time offset for each of the plurality of slave nodes on the noiseless timing distribution network, and where antenna nodes are communicably coupled through at least one of a wired connection or a wireless connection.

12: The method as any of Embodiments 1-11 describe, further may include: generating, via a primary master node, the master timing signal for at least one slave node, where the master node and the at least one slave node are from the plurality of sensor nodes included in the sensor array system; synchronizing, via the primary master node, the at least one slave node with the master timing signal being transmitted through a dedicated timing data channel; and cohering, via the processor node, data signals from the at least one slave node, where the processor node is from the plurality of sensor nodes.

13: The method as any of Embodiments 1-12 describe, where cohering synchronized data signals of the at least one slave node generates a combined signal, the combined signal having a power level greater than a power level of any of the sensor nodes.

14: The method as any of Embodiments 1-13 describe, further may include: generating, via the primary master node, a synchronization window protocol, and communicating timing signal data with the at least one slave node according to the synchronization window protocol.

15: The method as any of Embodiments 1-14 describe, where the at least one slave node continually listens for timing signal data.

16: The method as any of Embodiments 1-15 describe, where the at least one slave node listens for timing signal data during scheduled windows, according to the synchronization window protocol.

17: The method as any of Embodiments 1-16 describe, where the at least one slave node adaptively determines when to listen for timing signal data, according to the synchronization window protocol.

18: The method as any of Embodiments 1-17 describe, where the at least one slave node disregards unwanted data captured during a listening window according to the synchronization window protocol.

19: The method as any of Embodiments 1-18 describe, further may include: monitoring, via the primary master node, a primary clock drift for a grandmaster clock and a secondary clock drift for corresponding slave clock, where the grandmaster clock is included in the primary master node and the corresponding slave clock is included in the at least one slave node; updating, via the primary master node, a timing signal based on the primary clock drift; and modifying, via the primary master node, the synchronization window protocol based on the secondary clock drift.

20: The method as any of Embodiments 1-19 describe, further may include: determining, via the primary master node, an average secondary clock drift for a plurality of slave nodes; and modifying, via the primary master node, the synchronization window protocol based on the average secondary clock drift.

21: The method as any of Embodiments 1-20 describe, where the primary master node resynchronizes the at least one slave node if the secondary clock drift exceeds a desired threshold.

22: The method as any of Embodiments 1-21 describe, where the primary master node and the at least one slave node operate in a zero-hop network architecture.

23: The method as any of Embodiments 1-22 describe, where the at least one slave node is a plurality of slave nodes connected to the primary master node using a one-to-many master to slave protocol, the method further may include: sharing, by each of a plurality of sensor nodes, status information of a corresponding sensor node with the sensor array system; synchronizing the plurality of sensor nodes based on the status information of the plurality of sensor nodes used to synchronize data signals received or transmitted by the plurality of sensor nodes; generating, via the primary master node, a corresponding master timing signal for each of the plurality of slave nodes; and communicating, via the primary master node, the corresponding master timing signal for each of the plurality of slave nodes through a corresponding timing data channel.

24: The method as any of Embodiments 1-23 describe, where the plurality of slave nodes employs blind channel estimation and super sampling protocols to function as a passive sensing system, and where the primary master node resynchronizes the plurality of slave nodes to retain a picosecond temporal resolution.

25: The method as any of Embodiments 1-24 describe, where the plurality of slave nodes and the primary master node utilize a time synchronization protocol.

26: The method as any of Embodiments 1-25 describe, where the plurality of slave nodes performs adaptive angle of arrival tuning on passively received signals to determine a position, a heading, and a speed of at least one target.

27: The method as any of Embodiments 1-26 describe, where the plurality of sensor nodes is configured into a multistatic passive radar system.

28: The method as any of Embodiments 1-27 describe, where each of the plurality of slave nodes is representative of a cluster of sensor nodes that is synchronized to a secondary master node, and where each of the cluster of sensor nodes is connected to the secondary master node through a corresponding secondary timing channel, and where the secondary master node is synchronized to the primary master node.

29: The method as any of Embodiments 1-28 describe, where the primary master node and the at least one slave node communicate through a bidirectional stateless connection.

30: The method as any of Embodiments 1-29 describe, where the dedicated timing data channel is a fiber-optic connection between the primary master node and the at least one slave node.

31: The method as any of Embodiments 1-30 describe, where the dedicated timing data channel is a wireless connection between the primary master node and the at least one slave node.

32: The method as any of Embodiments 1-31 describe, where the synchronizing accounts for target velocity and gravitational field data when operating at relativistic scales.

33: The method as any of Embodiments 1-32 describe, where the plurality of sensor nodes operates as a noiseless network.

34: A non-transitory computer-readable medium storing a set of instructions for two-way time transfer in a coherent sensor array, the set of instructions may include: one or more instructions that, when executed by one or more processors of a device, cause the device to: establish, via a processor node, a zero-hop network architecture between a plurality of sensor nodes, where each of the plurality of sensor nodes includes a dedicated two-way time transfer (TWTT) channel; designate, via the processor node, a master node and a plurality of slave nodes, where the master node communicates with the dedicated TWTT channel for each of the plurality of slave nodes to form a noiseless timing distribution network; and distribute, via the master node, a master timing signal from a grandmaster clock, where the grandmaster clock achieves at least a picosecond time-synchronization fidelity between the master node and the plurality of slave nodes in the noiseless timing distribution network.

35: The non-transitory computer-readable medium as Embodiment 34 describes, where the master node performs diagnostic operations to assess a status and health of time synchronization accuracy between the master node and the plurality of slave nodes, time-synchronization fidelity of the grandmaster clock relative to both the master node and the plurality of slave nodes, a time offset and/or time deviation, and an achieved frequency deviation.

36: The non-transitory computer-readable medium as either of Embodiment 34 or 35 describe, where the master node uses the status and health of time synchronization accuracy as training data for a machine learning algorithm that adaptively improves time synchronization of the noiseless timing distribution network.

37: The non-transitory computer-readable medium as any of Embodiments 34-36 describe, where the master node updates a time synchronization schedule during the adaptive improvement.

38: The non-transitory computer-readable medium as any of Embodiments 34-37 describe, where results of the diagnostic operations are reported as a function of time to the master node during the adaptive improvement.

39: The non-transitory computer-readable medium as any of Embodiments 34-38 describe, where the master node calculates a time offset for each of the plurality of slave nodes, and the master node averages the time offsets to determine a true time offset.

40: The non-transitory computer-readable medium as any of Embodiments 34-39 describe, where the master node performs longitudinal averaging of the time offsets to determine a true time offset over multiple synchronization cycles.

41: The non-transitory computer-readable medium as any of Embodiments 34-40 describe, where the master node performs spatial averaging of the time offsets to determine a true time offset across the plurality of slave nodes at any given time.

42: The non-transitory computer-readable medium as any of Embodiments 34-41 describe, where the master node transmits the master timing signal to the plurality of slave nodes via a wired TWTT channel and the plurality of slave nodes transmit responses via a wireless TWTT channel.

43: The non-transitory computer-readable medium as any of Embodiments 34-42 describe, where the master node transmits a time-stamped message directing each of the plurality of slave nodes to transmit a slave timing signal at a future known time, and the slave timing signal is sent at the future known time and received by the master node, and a difference between the future known time and a time of receipt by the master node is used to calculate a node-specific time offset that correlates to a distance between the master node and a corresponding slave node from the plurality of slave nodes.

44: The non-transitory computer-readable medium as any of Embodiments 34-43 describe, where the processor node calibrates a phased array based on a true time delay between a plurality of antenna data channels, and the true time delay is the node-specific time offset for each of the plurality of slave nodes on the noiseless timing distribution network, and antenna nodes are communicably coupled through at least one of a wired connection or a wireless connection.

45: The non-transitory computer-readable medium as any of Embodiments 34-44 describe, where the one or more instructions further cause the device to: generate, via a primary master node, the master timing signal for at least one slave node, where the master node and the at least one slave node are from the plurality of sensor nodes included in the coherent sensor array; synchronize, via the primary master node, the at least one slave node with the master timing signal being transmitted through a dedicated timing data channel; and cohere, via the processor node, data signals from the at least one slave node, where the processor node is from the plurality of sensor nodes.

46: The non-transitory computer-readable medium as any of Embodiments 34-45 describe, where cohering synchronized data signals of the at least one slave node generates a combined signal, the combined signal having a power level greater than a power level of any of the sensor nodes.

47: The non-transitory computer-readable medium as any of Embodiments 34-46 describe, where the one or more instructions further cause the device to: generate, via the primary master node, a synchronization window protocol, and communicating timing signal data with the at least one slave node according to the synchronization window protocol.

48: The non-transitory computer-readable medium as any of Embodiments 34-47 describe, where the at least one slave node continually listens for timing signal data.

49: The non-transitory computer-readable medium as any of Embodiments 34-48 describe, where the at least one slave node listens for timing signal data during scheduled windows, according to the synchronization window protocol.

50: The non-transitory computer-readable medium as any of Embodiments 34-49 describe, where the at least one slave node adaptively determines when to listen for timing signal data, according to the synchronization window protocol.

51: The non-transitory computer-readable medium as any of Embodiments 34-50 describe, where the at least one slave node disregards unwanted data captured during a listening window according to the synchronization window protocol.

52: The non-transitory computer-readable medium as any of Embodiments 34-51 describe, where the one or more instructions further cause the device to: monitor, via the primary master node, a primary clock drift for a grandmaster clock and a secondary clock drift for corresponding slave clock, where the grandmaster clock is included in the primary master node and the corresponding slave clock is included in the at least one slave node; update, via the primary master node, a timing signal based on the primary clock drift; and modify, via the primary master node, the synchronization window protocol based on the secondary clock drift.

53: The non-transitory computer-readable medium as any of Embodiments 34-52 describe, where the one or more instructions further cause the device to: determine, via the primary master node, an average secondary clock drift for a plurality of slave nodes; and modify, via the primary master node, the synchronization window protocol based on the average secondary clock drift.

54: The non-transitory computer-readable medium as any of Embodiments 34-53 describe, where the primary master node resynchronizes the at least one slave node if the secondary clock drift exceeds a desired threshold.

55: The non-transitory computer-readable medium as any of Embodiments 34-54 describe, where the primary master node and the at least one slave node operate in a zero-hop network architecture.

56: The non-transitory computer-readable medium as any of Embodiments 34-55 describe, where the one or more instructions, when the at least one slave node is a plurality of slave nodes connected to the primary master node using a one-to-many master to slave protocol, the method may cause the device to: share, by each of plurality of sensor nodes, status information of a corresponding sensor node with the sensor array system; synchronize the plurality of sensor nodes based on the status information of the plurality of sensor nodes to synchronize data signals received or transmitted by the plurality of sensor nodes; generate, via the primary master node, a corresponding master timing signal for each of the plurality of slave nodes; and communicate, via the primary master node, the corresponding master timing signal for each of the plurality of slave nodes through a corresponding timing data channel.

57: The non-transitory computer-readable medium as any of Embodiments 34-56 describe, where the plurality of slave nodes employs blind channel estimation and super sampling protocols to function as a passive sensing system, and the primary master node resynchronizes the plurality of slave nodes to retain a picosecond temporal resolution.

58: The non-transitory computer-readable medium as any of Embodiments 34-57 describe, where the plurality of slave nodes and the primary master node utilize a time synchronization protocol.

59: The non-transitory computer-readable medium as any of Embodiments 34-58 describe, where the plurality of slave nodes performs adaptive angle of arrival tuning on passively received signals to determine a position, a heading, and a speed of at least one target.

60: The non-transitory computer-readable medium as any of Embodiments 34-59 describe, where the plurality of sensor nodes is configured into a multistatic passive radar system.

61: The non-transitory computer-readable medium as any of Embodiments 34-60 describe, where each of the plurality of slave nodes is representative of a cluster of sensor nodes that is synchronized to a secondary master node, and each of the cluster of sensor nodes is connected to the secondary master node through a corresponding secondary timing channel, and the secondary master node is synchronized to the primary master node.

62: The non-transitory computer-readable medium as any of Embodiments 34-61 describe, where the primary master node and the at least one slave node communicate through a bidirectional stateless connection.

63: The non-transitory computer-readable medium as any of Embodiments 34-62 describe, where the dedicated timing data channel is a fiber-optic connection between the primary master node and the at least one slave node.

64: The non-transitory computer-readable medium as any of Embodiments 34-63 describe, where the dedicated timing data channel is a wireless connection between the primary master node and the at least one slave node.

65: The non-transitory computer-readable medium as any of Embodiments 34-64 describe, where the synchronizing accounts for target velocity and gravitational field data when operating at relativistic scales.

66: The non-transitory computer-readable medium as any of Embodiments 34-65 describe, where the plurality of sensor nodes operates as a noiseless network.

67: A system for two-way time transfer in a coherent sensor array may include: one or more processors configured to: establish, via a processor node, a zero-hop network architecture between a plurality of sensor nodes, where each of the plurality of sensor nodes includes a dedicated two-way time transfer (TWTT) channel; designate, via the processor node, a master node and a plurality of slave nodes, where the master node communicates with the dedicated TWTT channel for each of the plurality of slave nodes to form a noiseless timing distribution network; and distribute, via the master node, a master timing signal from a grandmaster clock, where the grandmaster clock achieves at least a picosecond time-synchronization fidelity between the master node and the plurality of slave nodes in the noiseless timing distribution network.

68: The system as Embodiment 67 describes, where the master node performs diagnostic operations to assess a status and health of time synchronization accuracy between the master node and the plurality of slave nodes, time-synchronization fidelity of the grandmaster clock relative to both the master node and the plurality of slave nodes, a time offset and/or time deviation, and an achieved frequency deviation.

69: The system as either of Embodiment 67 or 68 describe, where the master node uses the status and health of time synchronization accuracy as training data for a machine learning algorithm that adaptively improves time synchronization of the noiseless timing distribution network.

70: The system as any of Embodiments 67-69 describe, where the master node updates a time synchronization schedule during the adaptive improvement.

71: The system as any of Embodiments 67-70 describe, where results of the diagnostic operations are reported as a function of time to the master node during the adaptive improvement.

72: The system as any of Embodiments 67-71 describe, where the master node calculates a time offset for each of the plurality of slave nodes, and the master node averages the time offsets to determine a true time offset.

73: The system as any of Embodiments 67-72 describe, where the master node performs longitudinal averaging of the time offsets to determine a true time offset over multiple synchronization cycles.

74: The system as any of Embodiments 67-73 describe, where the master node performs spatial averaging of the time offsets to determine a true time offset across the plurality of slave nodes at any given time.

75: The system as any of Embodiments 67-74 describe, where the master node transmits the master timing signal to the plurality of slave nodes via a wired TWTT channel and the plurality of slave nodes transmit responses via a wireless TWTT channel.

76: The system as any of Embodiments 67-75 describe, where the master node transmits a time-stamped message directing each of the plurality of slave nodes to transmit a slave timing signal at a future known time, and the slave timing signal is sent at the future known time and received by the master node, and a difference between the future known time and a time of receipt by the master node is used to calculate a node-specific time offset that correlates to a distance between the master node and a corresponding slave node from the plurality of slave nodes.

77: The system as any of Embodiments 67-76 describe, where the processor node calibrates a phased array based on a true time delay between a plurality of antenna data channels, and the true time delay is the node-specific time offset for each of the plurality of slave nodes on the noiseless timing distribution network, and antenna nodes are communicably coupled through at least one of a wired connection or a wireless connection.

78: The system as any of Embodiments 67-77 describe, where the one or more processors are further configured to: generate, via a primary master node, the master timing signal for at least one slave node, where the master node and the at least one slave node are from the plurality of sensor nodes included in the sensor array system; synchronize, via the primary master node, the at least one slave node with the master timing signal being transmitted through a dedicated timing data channel; and cohere, via the processor node, data signals from the at least one slave node, where the processor node is from the plurality of sensor nodes.

79: The system as any of Embodiments 67-78 describe, where cohering synchronized data signals of the at least one slave node generates a combined signal, the combined signal having a power level greater than a power level of any of the sensor nodes.

80: The system as any of Embodiments 67-79 describe, where the one or more processors are further configured to: generate, via the primary master node, a synchronization window protocol, and communicating timing signal data with the at least one slave node according to the synchronization window protocol.

81: The system as any of Embodiments 67-80 describe, where the at least one slave node continually listens for timing signal data.

82: The system as any of Embodiments 67-81 describe, where the at least one slave node listens for timing signal data during scheduled windows, according to the synchronization window protocol.

83: The system as any of Embodiments 67-82 describe, where the at least one slave node adaptively determines when to listen for timing signal data, according to the synchronization window protocol.

84: The system as any of Embodiments 67-83 describe, where the at least one slave node disregards unwanted data captured during a listening window according to the synchronization window protocol.

85: The system as any of Embodiments 67-84 describe, where the one or more processors are further configured to: monitor, via the primary master node, a primary clock drift for a grandmaster clock and a secondary clock drift for corresponding slave clock, where the grandmaster clock is included in the primary master node and the corresponding slave clock is included in the at least one slave node; update, via the primary master node, a timing signal based on the primary clock drift; and modify, via the primary master node, the synchronization window protocol based on the secondary clock drift.

86: The system as any of Embodiments 67-85 describe, where the one or more processors are further configured to: determine, via the primary master node, an average secondary clock drift for a plurality of slave nodes; and modify, via the primary master node, the synchronization window protocol based on the average secondary clock drift.

87: The system as any of Embodiments 67-86 describe, where the primary master node resynchronizes the at least one slave node if the secondary clock drift exceeds a desired threshold.

88: The system as any of Embodiments 67-87 describe, where the primary master node and the at least one slave node operate in a zero-hop network architecture.

89: The system as any of Embodiments 67-88 describe, where the one or more processors, when the at least one slave node is a plurality of slave nodes connected to the primary master node using a one-to-many master to slave protocol, the method, are configured to: share, by each of plurality of sensor nodes, status information of a corresponding sensor node with the sensor array system; synchronize the plurality of sensor nodes based on the status information of the plurality of sensor nodes to synchronize data signals received or transmitted by the plurality of sensor nodes; generate, via the primary master node, a corresponding master timing signal for each of the plurality of slave nodes; and communicate, via the primary master node, the corresponding master timing signal for each of the plurality of slave nodes through a corresponding timing data channel.

90: The system as any of Embodiments 67-89 describe, where the plurality of slave nodes employs blind channel estimation and super sampling protocols to function as a passive sensing system, and the primary master node resynchronizes the plurality of slave nodes to retain a picosecond temporal resolution.

91: The system as any of Embodiments 67-90 describe, where the plurality of slave nodes and the primary master node utilize a time synchronization protocol.

92: The system as any of Embodiments 67-91 describe, where the plurality of slave nodes performs adaptive angle of arrival tuning on passively received signals to determine a position, a heading, and a speed of at least one target.

93: The system as any of Embodiments 67-92 describe, where the plurality of sensor nodes is configured into a multistatic passive radar system.

94: The system as any of Embodiments 67-93 describe, where each of the plurality of slave nodes is representative of a cluster of sensor nodes that is synchronized to a secondary master node, and each of the cluster of sensor nodes is connected to the secondary master node through a corresponding secondary timing channel, and the secondary master node is synchronized to the primary master node.

95: The system as any of Embodiments 67-94 describe, where the primary master node and the at least one slave node communicate through a bidirectional stateless connection.

96: The system as any of Embodiments 67-95 describe, where the dedicated timing data channel is a fiber-optic connection between the primary master node and the at least one slave node.

97: The system as any of Embodiments 67-96 describe, where the dedicated timing data channel is a wireless connection between the primary master node and the at least one slave node.

98: The system as any of Embodiments 67-97 describe, where the synchronizing accounts for target velocity and gravitational field data when operating at relativistic scales.

99: The system as any of Embodiments 67-98 describe, where the plurality of sensor nodes operates as a noiseless network.

What is claimed is:

1. A method for two-way time transfer in a coherent sensor array system comprising:

establishing, via a processor node, a zero-hop network architecture between a plurality of sensor nodes, wherein each of the plurality of sensor nodes includes a dedicated two-way time transfer (TWTT) channel;

designating, via the processor node, a master node and a plurality of slave nodes, wherein the master node communicates with the dedicated TWTT channel for each of the plurality of slave nodes to form a noiseless timing distribution network; and distributing, via the master node, a master timing signal from a grandmaster clock, wherein the grandmaster clock achieves at least a picosecond time-synchronization fidelity between the master node and the plurality of slave nodes in the noiseless timing distribution network.

2. The method of claim 1, wherein the master node performs diagnostic operations to assess a status and health of time synchronization accuracy between the master node and the plurality of slave nodes, time-synchronization fidelity of the grandmaster clock relative to both the master node and the plurality of slave nodes, a time offset and/or time deviation, and an achieved frequency deviation.

3. The method of claim 2, wherein the master node uses the status and health of time synchronization accuracy as training data for a machine learning algorithm that adaptively improves time synchronization of the noiseless timing distribution network.

4. The method of claim 3, wherein the master node updates a time synchronization schedule during the adaptive improvement.

5. The method of claim 3, wherein results of the diagnostic operations are reported as a function of time to the master node during the adaptive improvement.

6. The method of claim 1, wherein the master node calculates a time offset for each of the plurality of slave nodes, and wherein the master node averages the time offsets to determine a true time offset.

7. The method of claim 6, wherein the master node performs longitudinal averaging of the time offsets to determine a true time offset over multiple synchronization cycles.

8. The method of claim 6, wherein the master node performs spatial averaging of the time offsets to determine a true time offset across the plurality of slave nodes at any given time.

9. The method of claim 1, wherein the master node transmits the master timing signal to the plurality of slave nodes via a wired TWTT channel and the plurality of slave nodes transmit responses via a wireless TWTT channel.

10. The method of claim 1, wherein the master node transmits a time-stamped message directing each of the plurality of slave nodes to transmit a slave timing signal at a future known time, and wherein the slave timing signal is sent at the future known time and received by the master node, and wherein a difference between the future known time and a time of receipt by the master node is used to calculate a node-specific time offset that correlates to a distance between the master node and a corresponding slave node from the plurality of slave nodes.

11. The method of claim 10, wherein the processor node calibrates a phased array based on a true time delay between a plurality of antenna nodes, and wherein the true time delay is the node-specific time offset for each of the plurality of slave nodes on the noiseless timing distribution network, and wherein antenna nodes are communicably coupled through at least one of a wired connection or a wireless connection.

12. The method of claim 1, further comprising:

generating, via a primary master node, the master timing signal for at least one slave node, wherein the master node and the at least one slave node are from the plurality of sensor nodes included in the sensor array system;

synchronizing, via the primary master node, the at least one slave node with the master timing signal being transmitted through a dedicated timing data channel; and cohering, via the processor node, data signals from the at least one slave node, wherein the processor node is from the plurality of sensor nodes.

13. The method of claim 12, wherein cohering synchronized data signals of the at least one slave node generates a combined signal, the combined signal having a power level greater than a power level of any of the sensor nodes.

14. The method of claim 12, further comprising:

generating, via the primary master node, a synchronization window protocol, and communicating timing signal data with the at least one slave node according to the synchronization window protocol.

15. The method of claim 14, wherein the at least one slave node continually listens for timing signal data.

16. The method of claim 14, wherein the at least one slave node listens for timing signal data during scheduled windows, according to the synchronization window protocol.

17. The method of claim 14, wherein the at least one slave node adaptively determines when to listen for timing signal data, according to the synchronization window protocol.

18. The method of claim 14, wherein the at least one slave node disregards unwanted data captured during a listening window according to the synchronization window protocol.

19. The method of claim 14, further comprising:

monitoring, via the primary master node, a primary clock drift for a grandmaster clock and a secondary clock drift for corresponding slave clock, wherein the grandmaster clock is included in the primary master node and the corresponding slave clock is included in the at least one slave node;

updating, via the primary master node, a timing signal based on the primary clock drift; and modifying, via the primary master node, the synchronization window protocol based on the secondary clock drift.

20. The method of claim 19, further comprising:

determining, via the primary master node, an average secondary clock drift for a plurality of slave nodes; and modifying, via the primary master node, the synchronization window protocol based on the average secondary clock drift.

21. The method of claim 19, wherein the primary master node resynchronizes the at least one slave node if the secondary clock drift exceeds a desired threshold.

22. The method of claim 12, wherein the primary master node and the at least one slave node operate in a zero-hop network architecture.

23. The method of claim 12, wherein the at least one slave node is a plurality of slave nodes connected to the primary master node using a one-to-many master to slave protocol, the method further comprising:

sharing, by each of a plurality of sensor nodes, status information of a corresponding sensor node with the sensor array system;

synchronizing the plurality of sensor nodes based on the status information of the plurality of sensor nodes used to synchronize data signals received or transmitted by the plurality of sensor nodes;

generating, via the primary master node, a corresponding master timing signal for each of the plurality of slave nodes; and communicating, via the primary master node, the corresponding master timing signal for each of the plurality of slave nodes through a corresponding timing data channel.

24. The method of claim 23, wherein the plurality of slave nodes employs blind channel estimation and super sampling protocols to function as a passive sensing system, and wherein the primary master node resynchronizes the plurality of slave nodes to retain a picosecond temporal resolution.

25. The method of claim 24, wherein the plurality of slave nodes and the primary master node utilize a time synchronization protocol.

26. The method of claim 24, wherein the plurality of slave nodes performs adaptive angle of arrival tuning on passively received signals to determine a position, a heading, and a speed of at least one target.

27. The method of claim 23, wherein the plurality of sensor nodes is configured into a multistatic passive radar system.

28. The method of claim 23, wherein each of the plurality of slave nodes is representative of a cluster of sensor nodes that is synchronized to a secondary master node, and wherein each of the cluster of sensor nodes is connected to the secondary master node through a corresponding secondary timing channel, and wherein the secondary master node is synchronized to the primary master node.

29. The method of claim 12, wherein the primary master node and the at least one slave node communicate through a bidirectional stateless connection.

30. The method of claim 12, wherein the dedicated timing data channel is a fiber-optic connection between the primary master node and the at least one slave node.

31. The method of claim 12, wherein the dedicated timing data channel is a wireless connection between the primary master node and the at least one slave node.

32. The method of claim 12, wherein the synchronizing accounts for target velocity and gravitational field data when operating at relativistic scales.

33. The method of claim 12, wherein the plurality of sensor nodes operates as a noiseless network.

34. A non-transitory computer-readable medium storing a set of instructions for two-way time transfer in a coherent sensor array, the set of instructions comprising:

one or more instructions that, when executed by one or more processors of a device, cause the device to:

establish, via a processor node, a zero-hop network architecture between a plurality of sensor nodes, wherein each of the plurality of sensor nodes includes a dedicated two-way time transfer (TWTT) channel;

designate, via the processor node, a master node and a plurality of slave nodes, wherein the master node communicates with the dedicated TWTT channel for each of the plurality of slave nodes to form a noiseless timing distribution network; and distribute, via the master node, a master timing signal from a grandmaster clock, wherein the grandmaster clock achieves at least a picosecond time-synchronization fidelity between the master node and the plurality of slave nodes in the noiseless timing distribution network.

35. The non-transitory computer-readable medium of claim 34, wherein the master node performs diagnostic operations to assess a status and health of time synchronization accuracy between the master node and the plurality of slave nodes, time-synchronization fidelity of the grandmaster clock relative to both the master node and the plurality of slave nodes, a time offset and/or time deviation, and an achieved frequency deviation.

36. The non-transitory computer-readable medium of claim 35, wherein the master node uses the status and health of time synchronization accuracy as training data for a machine learning algorithm that adaptively improves time synchronization of the noiseless timing distribution network.

37. The non-transitory computer-readable medium of claim 36, wherein the master node updates a time synchronization schedule during the adaptive improvement.

38. The non-transitory computer-readable medium of claim 36, wherein results of the diagnostic operations are reported as a function of time to the master node during the adaptive improvement.

39. The non-transitory computer-readable medium of claim 34, wherein the master node calculates a time offset for each of the plurality of slave nodes, and the master node averages the time offsets to determine a true time offset.

40. The non-transitory computer-readable medium of claim 39, wherein the master node performs longitudinal averaging of the time offsets to determine a true time offset over multiple synchronization cycles.

41. The non-transitory computer-readable medium of claim 39, wherein the master node performs spatial averaging of the time offsets to determine a true time offset across the plurality of slave nodes at any given time.

42. The non-transitory computer-readable medium of claim 34, wherein the master node transmits the master timing signal to the plurality of slave nodes via a wired TWTT channel and the plurality of slave nodes transmit responses via a wireless TWTT channel.

43. The non-transitory computer-readable medium of claim 34, wherein the master node transmits a time-stamped message directing each of the plurality of slave nodes to transmit a slave timing signal at a future known time, and the slave timing signal is sent at the future known time and received by the master node, and a difference between the future known time and a time of receipt by the master node is used to calculate a node-specific time offset that correlates to a distance between the master node and a corresponding slave node from the plurality of slave nodes.

44. The non-transitory computer-readable medium of claim 43, wherein the processor node calibrates a phased array based on a true time delay between a plurality of antenna data channels, and the true time delay is the node-specific time offset for each of the plurality of slave nodes on the noiseless timing distribution network, and antenna nodes are communicably coupled through at least one of a wired connection or a wireless connection.

45. The non-transitory computer-readable medium of claim 34, wherein the one or more instructions further cause the device to:

generate, via a primary master node, the master timing signal for at least one slave node, wherein the master node and the at least one slave node are from the plurality of sensor nodes included in the coherent sensor array;

synchronize, via the primary master node, the at least one slave node with the master timing signal being transmitted through a dedicated timing data channel; and cohere, via the processor node, data signals from the at least one slave node, wherein the processor node is from the plurality of sensor nodes.

46. The non-transitory computer-readable medium of claim 45, wherein cohering synchronized data signals of the at least one slave node generates a combined signal, the combined signal having a power level greater than a power level of any of the sensor nodes.

47. The non-transitory computer-readable medium of claim 45, wherein the one or more instructions further cause the device to:

generate, via the primary master node, a synchronization window protocol, and communicating timing signal data with the at least one slave node according to the synchronization window protocol.

48. The non-transitory computer-readable medium of claim 47, wherein the at least one slave node continually listens for timing signal data.

49. The non-transitory computer-readable medium of claim 47, wherein the at least one slave node listens for timing signal data during scheduled windows, according to the synchronization window protocol.

50. The non-transitory computer-readable medium of claim 47, wherein the at least one slave node adaptively determines when to listen for timing signal data, according to the synchronization window protocol.

51. The non-transitory computer-readable medium of claim 47, wherein the at least one slave node disregards unwanted data captured during a listening window according to the synchronization window protocol.

52. The non-transitory computer-readable medium of claim 47, wherein the one or more instructions further cause the device to:

monitor, via the primary master node, a primary clock drift for a grandmaster clock and a secondary clock drift for corresponding slave clock, wherein the grandmaster clock is included in the primary master node and the corresponding slave clock is included in the at least one slave node;

update, via the primary master node, a timing signal based on the primary clock drift; and modify, via the primary master node, the synchronization window protocol based on the secondary clock drift.

53. The non-transitory computer-readable medium of claim 52, wherein the one or more instructions further cause the device to:

determine, via the primary master node, an average secondary clock drift for a plurality of slave nodes; and modify, via the primary master node, the synchronization window protocol based on the average secondary clock drift.

54. The non-transitory computer-readable medium of claim 52, wherein the primary master node resynchronizes the at least one slave node if the secondary clock drift exceeds a desired threshold.

55. The non-transitory computer-readable medium of claim 45, wherein the primary master node and the at least one slave node operate in a zero-hop network architecture.

56. The non-transitory computer-readable medium of claim 45, wherein the one or more instructions, when the at least one slave node is a plurality of slave nodes connected to the primary master node using a one-to-many master to slave protocol, the method may cause the device to:

share, by each of plurality of sensor nodes, status information of a corresponding sensor node with the sensor array system;

synchronize the plurality of sensor nodes based on the status information of the plurality of sensor nodes to synchronize data signals received or transmitted by the plurality of sensor nodes;

generate, via the primary master node, a corresponding master timing signal for each of the plurality of slave nodes; and communicate, via the primary master node, the corresponding master timing signal for each of the plurality of slave nodes through a corresponding timing data channel.

57. The non-transitory computer-readable medium of claim 56, wherein the plurality of slave nodes employs blind channel estimation and super sampling protocols to function as a passive sensing system, and the primary master node resynchronizes the plurality of slave nodes to retain a picosecond temporal resolution.

58. The non-transitory computer-readable medium of claim 57, wherein the plurality of slave nodes and the primary master node utilize a time synchronization protocol.

59. The non-transitory computer-readable medium of claim 57, wherein the plurality of slave nodes performs adaptive angle of arrival tuning on passively received signals to determine a position, a heading, and a speed of at least one target.

60. The non-transitory computer-readable medium of claim 56, wherein the plurality of sensor nodes is configured into a multistatic passive radar system.

61. The non-transitory computer-readable medium of claim 56, wherein each of the plurality of slave nodes is representative of a cluster of sensor nodes that is synchronized to a secondary master node, and each of the cluster of sensor nodes is connected to the secondary master node through a corresponding secondary timing channel, and the secondary master node is synchronized to the primary master node.

62. The non-transitory computer-readable medium of claim 45, wherein the primary master node and the at least one slave node communicate through a bidirectional stateless connection.

63. The non-transitory computer-readable medium of claim 45, wherein the dedicated timing data channel is a fiber-optic connection between the primary master node and the at least one slave node.

64. The non-transitory computer-readable medium of claim 45, wherein the dedicated timing data channel is a wireless connection between the primary master node and the at least one slave node.

65. The non-transitory computer-readable medium of claim 45, wherein the synchronizing accounts for target velocity and gravitational field data when operating at relativistic scales.

66. The non-transitory computer-readable medium of claim 45, wherein the plurality of sensor nodes operates as a noiseless network.

67. A system for two-way time transfer in a coherent sensor array comprising:

one or more processors configured to:

establish, via a processor node, a zero-hop network architecture between a plurality of sensor nodes, wherein each of the plurality of sensor nodes includes a dedicated two-way time transfer (TWTT) channel;

designate, via the processor node, a master node and a plurality of slave nodes, wherein the master node communicates with the dedicated TWTT channel for each of the plurality of slave nodes to form a noiseless timing distribution network; and distribute, via the master node, a master timing signal from a grandmaster clock, wherein the grandmaster clock achieves at least a picosecond time-synchronization fidelity between the master node and the plurality of slave nodes in the noiseless timing distribution network.

68. The system of claim 67, wherein the master node performs diagnostic operations to assess a status and health of time synchronization accuracy between the master node and the plurality of slave nodes, time-synchronization fidelity of the grandmaster clock relative to both the master node and the plurality of slave nodes, a time offset and/or time deviation, and an achieved frequency deviation.

69. The system of claim 68, wherein the master node uses the status and health of time synchronization accuracy as training data for a machine learning algorithm that adaptively improves time synchronization of the noiseless timing distribution network.

70. The system of claim 69, wherein the master node updates a time synchronization schedule during the adaptive improvement.

71. The system of claim 69, wherein results of the diagnostic operations are reported as a function of time to the master node during the adaptive improvement.

72. The system of claim 67, wherein the master node calculates a time offset for each of the plurality of slave nodes, and the master node averages the time offsets to determine a true time offset.

73. The system of claim 72, wherein the master node performs longitudinal averaging of the time offsets to determine a true time offset over multiple synchronization cycles.

74. The system of claim 72, wherein the master node performs spatial averaging of the time offsets to determine a true time offset across the plurality of slave nodes at any given time.

75. The system of claim 67, wherein the master node transmits the master timing signal to the plurality of slave nodes via a wired TWTT channel and the plurality of slave nodes transmit responses via a wireless TWTT channel.

76. The system of claim 67, wherein the master node transmits a time-stamped message directing each of the plurality of slave nodes to transmit a slave timing signal at a future known time, and the slave timing signal is sent at the future known time and received by the master node, and a difference between the future known time and a time of receipt by the master node is used to calculate a node-specific time offset that correlates to a distance between the master node and a corresponding slave node from the plurality of slave nodes.

77. The system of claim 76, wherein the processor node calibrates a phased array based on a true time delay between a plurality of antenna data channels, and the true time delay is the node-specific time offset for each of the plurality of slave nodes on the noiseless timing distribution network, and antenna nodes are communicably coupled through at least one of a wired connection or a wireless connection.

78. The system of claim 67, wherein the one or more processors are further configured to:

generate, via a primary master node, the master timing signal for at least one slave node, wherein the master node and the at least one slave node are from the plurality of sensor nodes included in the sensor array system;

synchronize, via the primary master node, the at least one slave node with the master timing signal being transmitted through a dedicated timing data channel; and cohere, via the processor node, data signals from the at least one slave node, wherein the processor node is from the plurality of sensor nodes.

79. The system of claim 78, wherein cohering synchronized data signals of the at least one slave node generates a combined signal, the combined signal having a power level greater than a power level of any of the sensor nodes.

80. The system of claim 78, wherein the one or more processors are further configured to:

generate, via the primary master node, a synchronization window protocol, and communicating timing signal data with the at least one slave node according to the synchronization window protocol.

81. The system of claim 80, wherein the at least one slave node continually listens for timing signal data.

82. The system of claim 80, wherein the at least one slave node listens for timing signal data during scheduled windows, according to the synchronization window protocol.

83. The system of claim 80, wherein the at least one slave node adaptively determines when to listen for timing signal data, according to the synchronization window protocol.

84. The system of claim 80, wherein the at least one slave node disregards unwanted data captured during a listening window according to the synchronization window protocol.

85. The system of claim 80, wherein the one or more processors are further configured to:

monitor, via the primary master node, a primary clock drift for a grandmaster clock and a secondary clock drift for corresponding slave clock, wherein the grandmaster clock is included in the primary master node and the corresponding slave clock is included in the at least one slave node;

update, via the primary master node, a timing signal based on the primary clock drift; and modify, via the primary master node, the synchronization window protocol based on the secondary clock drift.

86. The system of claim 85, wherein the one or more processors are further configured to:

determine, via the primary master node, an average secondary clock drift for a plurality of slave nodes; and modify, via the primary master node, the synchronization window protocol based on the average secondary clock drift.

87. The system of claim 85, wherein the primary master node resynchronizes the at least one slave node if the secondary clock drift exceeds a desired threshold.

88. The system of claim 78, wherein the primary master node and the at least one slave node operate in a zero-hop network architecture.

89. The system of claim 78, wherein the one or more processors, when the at least one slave node is a plurality of slave nodes connected to the primary master node using a one-to-many master to slave protocol, the method, are configured to:

share, by each of plurality of sensor nodes, status information of a corresponding sensor node with the sensor array system;

synchronize the plurality of sensor nodes based on the status information of the plurality of sensor nodes to synchronize data signals received or transmitted by the plurality of sensor nodes;

generate, via the primary master node, a corresponding master timing signal for each of the plurality of slave nodes; and communicate, via the primary master node, the corresponding master timing signal for each of the plurality of slave nodes through a corresponding timing data channel.

90. The system of claim 89, wherein the plurality of slave nodes employs blind channel estimation and super sampling protocols to function as a passive sensing system, and the primary master node resynchronizes the plurality of slave nodes to retain a picosecond temporal resolution.

91. The system of claim 90, wherein the plurality of slave nodes and the primary master node utilize a time synchronization protocol.

92. The system of claim 90, wherein the plurality of slave nodes performs adaptive angle of arrival tuning on passively received signals to determine a position, a heading, and a speed of at least one target.

93. The system of claim 89, wherein the plurality of sensor nodes is configured into a multistatic passive radar system.

94. The system of claim 89, wherein each of the plurality of slave nodes is representative of a cluster of sensor nodes that is synchronized to a secondary master node, and each of the cluster of sensor nodes is connected to the secondary master node through a corresponding secondary timing channel, and the secondary master node is synchronized to the primary master node.

95. The system of claim 78, wherein the primary master node and the at least one slave node communicate through a bidirectional stateless connection.

96. The system of claim 78, wherein the dedicated timing data channel is a fiber-optic connection between the primary master node and the at least one slave node.

97. The system of claim 78, wherein the dedicated timing data channel is a wireless connection between the primary master node and the at least one slave node.

98. The system of claim 78, wherein the synchronizing accounts for target velocity and gravitational field data when operating at relativistic scales.

99. The system of claim 78, wherein the plurality of sensor nodes operates as a noiseless network.

* * * * *